(12) United States Patent
Sakurai et al.

(10) Patent No.: US 7,512,307 B2
(45) Date of Patent: Mar. 31, 2009

(54) METHOD OF MAKING OPTICAL CONNECTOR FERRULE, DIE FOR MAKING OPTICAL CONNECTOR FERRULE, OPTICAL CONNECTOR FERRULE MADE BY THIS METHOD, AND OPTICAL CONNECTOR AND OPTICAL WIRING SYSTEM USING THE SAME

(75) Inventors: Wataru Sakurai, Yokohama (JP); Hiroshi Katsura, Yokohama (JP); Toshiaki Kakii, Yokohama (JP); Kei Sunaga, Yokohama (JP); Tomohiko Ueda, Yokohama (JP); Toshifumi Hosoya, Yokohama (JP); Daizo Nishioka, Yokohama (JP); Kenichiro Ohtsuka, Yokohama (JP); Yuko Masunaga, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/495,734

(22) Filed: Jul. 31, 2006

(65) Prior Publication Data

US 2006/0263034 A1    Nov. 23, 2006

Related U.S. Application Data

(62) Division of application No. 10/497,085, filed as application No. PCT/JP02/12544 on Nov. 29, 2002, now Pat. No. 7,410,303.

(30) Foreign Application Priority Data

| Nov. 29, 2001 | (JP) | 2001/364934 |
| Apr. 10, 2002 | (JP) | 2002/108438 |
| Apr. 18, 2002 | (JP) | 2002/116677 |
| Aug. 30, 2002 | (JP) | 2002/254992 |

(51) Int. Cl.
*G02B 6/00* (2006.01)

(52) U.S. Cl. ...................................... 385/138
(58) Field of Classification Search ............... None
See application file for complete search history.

(56) References Cited

U.S. PATENT DOCUMENTS 5,155,785 A * 10/1992 Holland et al. ............. 385/89

(Continued)

FOREIGN PATENT DOCUMENTS

JP       6582/1985       8/1986

(Continued)

OTHER PUBLICATIONS

JIS C5981-1990; "F12 Type Connectors for Optical Fiber Ribbons"; Sep. 28, 1992; pp. 1646-1653.

(Continued)

*Primary Examiner*—Sung H Pak
*Assistant Examiner*—Hoang Tran
(74) *Attorney, Agent, or Firm*—McDermott Will & Emery LLP

(57) ABSTRACT

An optical connector ferrule molding die 1 for molding an optical connector ferrule having a plurality of optical fiber holes comprises an upper die 10, a lower die 11, and an intermediate die 12, whereas the intermediate die 12 comprises a plurality of optical fiber hole forming pins 126 for forming optical fiber holes. The lower die 11 is provided with a protrusion 114 for forming a window hole of the optical connector ferrule, whereas the optical fiber hole forming pins 126 projecting from the intermediate die 12 are secured by through holes 115 penetrating through the protrusion 114 and V-grooves 113.

10 Claims, 29 Drawing Sheets

U.S. PATENT DOCUMENTS

| | | |
|---|---|---|
| 5,602,951 A | 2/1997 | Shiota et al. |
| 5,732,173 A * | 3/1998 | Bylander et al. ............... 385/49 |
| 6,442,322 B1 * | 8/2002 | Chen et al. .................. 385/137 |
| 6,478,479 B1 * | 11/2002 | Kim et al. ..................... 385/92 |
| 6,668,124 B2 * | 12/2003 | Kondo et al. ................ 385/134 |
| 6,719,927 B2 | 4/2004 | Sakurai et al. |
| 2004/0071407 A1 * | 4/2004 | Vergeest ...................... 385/58 |

FOREIGN PATENT DOCUMENTS

| | | |
|---|---|---|
| JP | 63-169606 A | 7/1988 |
| JP | 05-249346 | 9/1993 |
| JP | 6-059157 A | 3/1994 |
| JP | 06-148447 | 5/1994 |
| JP | 08-313762 | 11/1996 |
| JP | 7-333467 | 2/1997 |
| JP | 2000-289058 A | 10/2000 |
| JP | 2000-515986 | 11/2000 |
| JP | 2001-318276 | 11/2001 |
| JP | 2001-318276 A | 11/2001 |
| WO | WO95/29422 | 2/1995 |
| WO | WO00/08504 | 2/2000 |

OTHER PUBLICATIONS

US Office Action issued in corresponding U.S. Appl. No. 10/497,085, dated Jul. 26, 2006.

United States Office Action issued U.S. Appl. No. 10/497,085 dated on Apr. 4, 2008.

* cited by examiner

DISTAL END SIDE OF OPTICAL FIBER HOLE FORMING PIN 126

DISTAL END SIDE OF OPTICAL FIBER HOLE FORMING PIN 126

US 7,512,307 B2

METHOD OF MAKING OPTICAL CONNECTOR FERRULE, DIE FOR MAKING OPTICAL CONNECTOR FERRULE, OPTICAL CONNECTOR FERRULE MADE BY THIS METHOD, AND OPTICAL CONNECTOR AND OPTICAL WIRING SYSTEM USING THE SAME

RELATED APPLICATIONS

This application is a divisional of U.S. patent application Ser. No. 10/497,085, filed Jan. 19, 2005 now U.S. Pat. No. 7,410,303, which is a 371 Application PCT/JP02/12544, filed Nov. 29, 2002, based on Japanese Patent Application Nos. 2001-364934, filed Nov. 29, 2001; 2002/108438, filed Apr. 10, 2002; 2002/116677, filed Apr. 18, 2002; and 2002/254992, filed Aug. 30, 2002, and the contents of which are hereby incorporated by reference.

TECHNICAL FIELD

The present invention relates to a method of making an optical connector ferrule, a die for making the same, an optical connector ferrule made by this method, and an optical connector and optical wiring system using this optical connector ferrule.

BACKGROUND ART

Known as one of optical connector ferrules is an MT (Mechanically Transferable) connector ferrule. This MT connector ferrule has been standardized as IEC60874-16 (1994) and JIS C5981, and comprises a pair of guide holes into which guide pins are inserted and a plurality of fiber holes, disposed between these guide holes, for receiving respective optical fibers.

FIG. 29 shows an example of molding die for molding such an MT connector ferrule. The molding die 60 is constituted by an upper die 69a, a lower die 69b, and an intermediate die 65 inserted therebetween. In the intermediate die 65, a pair of planar holding members 65a, 65b sandwich and hold therebetween two guide hole forming pins 61 for forming optical connector ferrule guide holes. Held between these guide hole forming pins 61 are a pair of holding members 70a, 70b which are thinner and narrower than the holding members 65a, 65b. A plurality of optical fiber hole forming pins 63 projecting from distal ends of the holding members 70a, 70b so as to form optical fiber holes of an optical connector ferrule are arranged. The inner faces of the upper die 69a and lower die 69b are processed so as to form a space corresponding to the outer shape of the optical connector ferrule when all the dies are assembled together, and are further provided with grooves 72, 62 for positioning the respective guide hole forming pins 61, and grooves 64 for positioning the respective optical fiber hole forming pins 63. The lower die 69b is provided with a protrusion 71 for forming a window frame for the ferrule.

When molding an optical connector ferrule by using such a molding die 60, the intermediate die 65 is initially disposed between the upper die 69a and lower die 69b. Specifically, the guide pin forming pins 61 of the intermediate die 65 are placed in the grooves 72 of the upper die 69a and the grooves 62 of the lower die 69b, and the optical fiber hole forming pins 63 are arranged in the grooves 64 of the lower die 69b. Here, as shown in FIG. 31, the holding member 70b of the intermediate die 65 is held on the protrusion 71 of the lower die 69b. Then, the space between the upper die 69a and the lower die 69b is filled with a molten resin, which is subsequently set and taken out of the die, whereby the optical connector ferrule can be formed.

Thus formed MT connector ferrule is used for connecting optical fibers on an optical transmission line to each other or an optical fiber to an optical member. Here, not only a method in which MT connector ferrules are connected to each other as they are, a method in which the ferrules are provided with housings so as to be formed into connectors for connection has widely been carried out. Widely known as examples of such optical connectors are a connector (generally known as MPX connector) disclosed in Japanese Translated PCT International Patent Application No. 2000-515986A and a multi-fiber connector (generally known as MPO connector) specified in TIA/EIA-604-5-A. When these multi-fiber connectors are used, devices and wiring systems can be made much smaller and denser than those with single-fiber optical connectors. Therefore, backplane wiring, optical interconnected wiring, and the like using these optical connectors as an interface have widely been in use.

DISCLOSURE OF THE INVENTION

The holding members 70a, 70b in the intermediate die 65 correspond to a hole for receiving the tape coating of a coated optical fiber tape in the optical fiber connector ferrule formed. The tape coating is so thin that the hole for receiving the tape coating becomes narrow, which makes it necessary to thin the holding members 70a, 70b, whereby they are relatively short of rigidity. Therefore, when holding the fiber hole forming pins 63, distal end parts of the holding members 70a, 70b may open and yield a gap therebetween as shown in FIGS. 30A and 30B. In this case, when a molten resin is injected during molding, it may enter the gap formed between the holding members 70a, 70b and disorder the arrangement of the optical fiber hole forming pins 63. Specifically, as shown in FIG. 31, the resin during molding may enter under the optical fiber hole forming pins 63, whereby the optical fiber hole forming pins 63 may move up while obliquely bending their distal end parts, thus yielding an optical connector ferrule with curved optical fiber holes. In this case, problems such as increases in splice loss may occur when establishing an optical connection by inserting optical fibers into optical fiber holes.

It is an object of the present invention to provide a method of making an optical connector ferrule and a molding die which can improve the accuracy in arrangement of optical fiber holes in an optical connector ferrule molded, an optical connector ferrule made by this method, and an optical connector and optical wiring system using this ferrule.

For achieving the above-mentioned object, the present invention provides a molding die for an optical connector ferrule, the molding die comprising an upper die, a lower die, and an intermediate die disposed therebetween having a plurality of optical fiber hole forming pins, the molding die molding an optical connector ferrule having a plurality of optical fiber holes by injecting and setting a resin therein, wherein the lower die has an inner face provided with a protrusion for forming a window hole at a center part of a body of the optical connector ferrule molded, the protrusion being provided with a through hole for inserting and securing the optical fiber hole forming pins of the intermediate die.

When the optical fiber hole forming pins are inserted through the protrusion for forming the window hole and secured therein as such, deformations of the optical fiber hole forming pins such as bending are suppressed. This improves the accuracy in arrangements of optical fiber holes in the optical connector ferrule made.

The intermediate die is not always inserted in one direction, but may comprise first and second intermediate dies inserted into the lower die in directions opposite from each other. In this case, any of the first and second lower dies may be provided with the optical fiber hole forming pins. Alternatively, the optical fiber hole forming pins may be divided into the first and second intermediate dies and connected/secured between the first and second intermediate dies. This can further improve the accuracy in arrangements.

Preferably, on a connecting end face side of the optical connector ferrule molded, the protrusion is provided with a cutout formed by exposing and opening a part of the peripheral face of the through hole, or a raised part extending along the through hole and having a semicircular cross section with an outer shape increasing as being distanced farther from the connecting end face side. This makes it easier to form a groove connecting with an optical fiber inserting hole.

Preferably, the through hole of the protrusion is arranged so as to shift outward from a center of arrangement positions of the optical fiber hole forming pins at a location corresponding to the connecting end face side of the optical connector ferrule molded. This can suppress the influence of bending of the optical fiber holes during resin molding. Preferably, a line connecting a center of the through hole in the protrusion and a center of a fixing hole on the connecting end face side and a normal from the center of the fixing hole form an angle set to about 0.4 degree or less therebetween.

The present invention includes a method of making an optical connector ferrule using this molding die, and an optical connector ferrule molded by this method.

The optical connector ferrule in accordance with the present invention includes a resin-molded optical connector ferrule comprising a plurality of optical fiber holes arranged therein for receiving and securing respective optical fibers, wherein the optical fiber holes are arranged while being bent such that positions thereof on an inserting end side in a depth of the ferrule are shifted outward from an arrangement center than is the arrangement on the connecting end side. Preferably, the optical fiber hole has a bending angle of 0.2 degree or less at the connecting end face. This can fully reduce the splice loss.

The present invention further includes an optical connector, an optical member, and an optical wiring system which use the foregoing optical connector ferrule.

BRIEF DESCRIPTION OF THE DRAWINGS

FIG. 4 is an exploded perspective view showing a second embodiment of the optical connector ferrule molding die in accordance with the present invention, whereas

FIG. 7 is an exploded perspective view showing a third embodiment of the optical connector ferrule molding die in accordance with the present invention, whereas

FIG. 9 is an exploded perspective view showing a fourth embodiment of the optical connector ferrule molding die in accordance with the present invention, whereas

FIG. 11 is an exploded perspective view showing a fifth embodiment of the optical connector ferrule molding die in accordance with the present invention, whereas

FIG. 13 is an exploded perspective view showing a sixth embodiment of the optical connector ferrule molding die in accordance with the present invention, whereas

FIG. 16 is a perspective view of an optical connector ferrule made by this die, whereas

FIG. 19 is a perspective view showing the structure of a lower die in FIG. 15 in detail, whereas

BEST MODE FOR CARRYING OUT THE INVENTION

Figure 1:
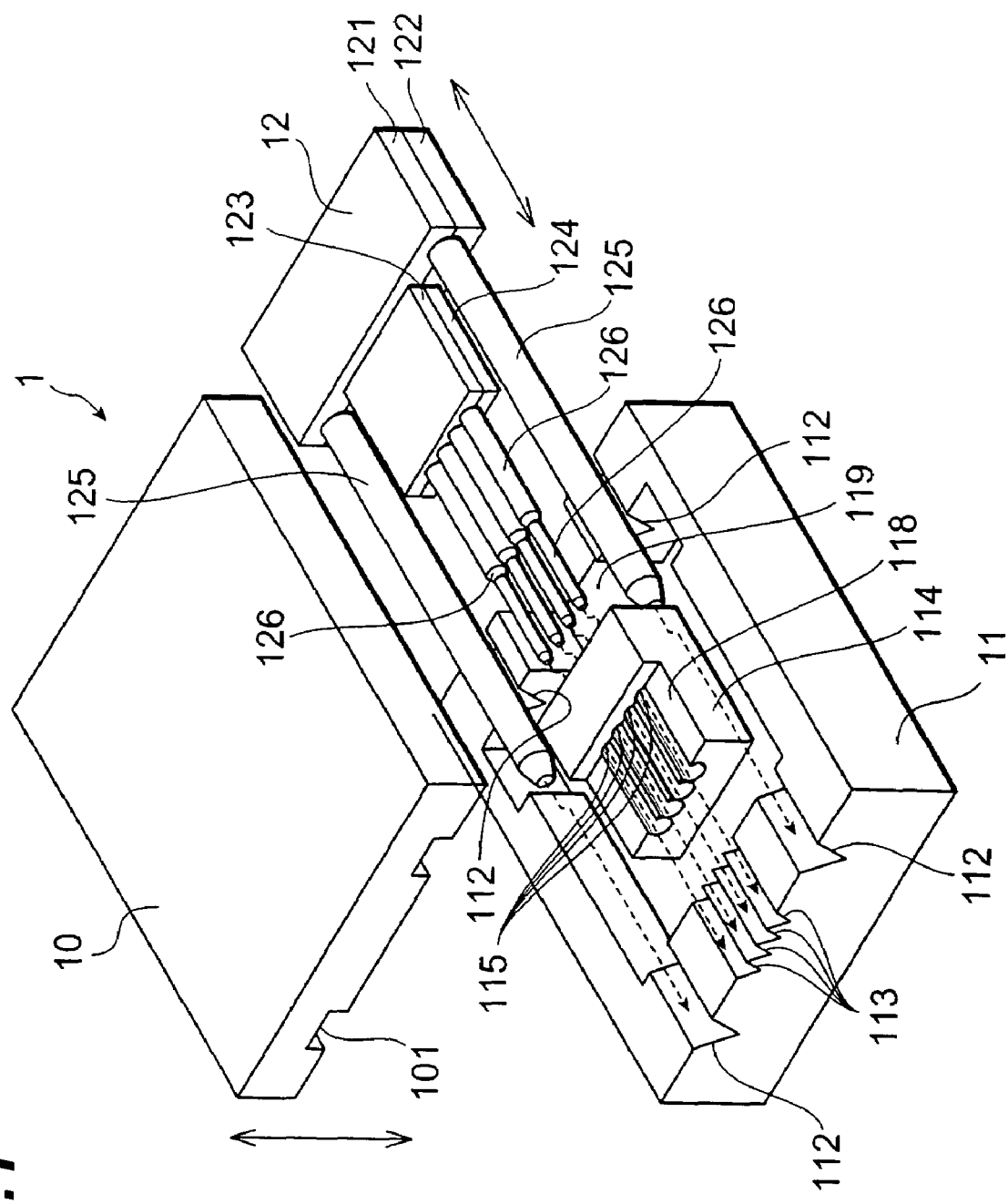
FIG. 1 is an exploded perspective view showing a first embodiment of the optical connector ferrule molding die in accordance with the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted.

First Embodiment

Figure 2:
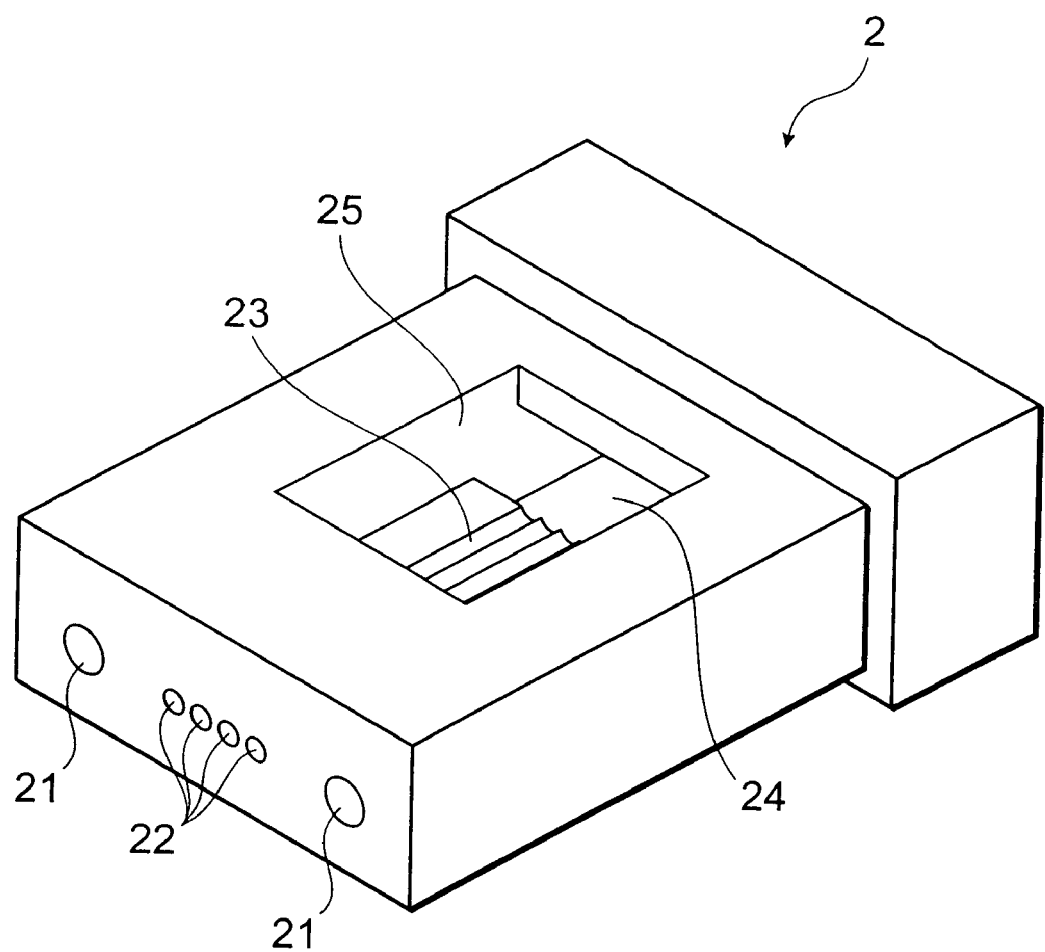
FIG. 2 is a perspective view showing an example of multi-fiber MT optical connector ferrule molded by using the optical connector ferrule molding die shown in FIG. 1.

FIG. 1 is an exploded perspective view showing a first embodiment 1 of the optical connector ferrule molding die in accordance with the present invention. The optical connector ferrule molding die 1 (hereinafter simply referred to as molding die 1) in accordance with this embodiment is used for molding a multi-fiber MT optical connector ferrule (hereinafter simply referred to as ferrule). FIG. 2 shows the ferrule molded by this molding die 1. The ferrule 2 has two guide holes 21 into which guide pins (not shown) are inserted, whereas four optical fiber holes 22 for receiving respective optical fibers (not shown) exposed from a coated 4-optical-fiber tape are provided. Provided on the rear end side of the optical fiber holes 22 is an optical fiber groove 23 which acts as a guide when inserting the exposed optical fibers into the optical fiber holes 22, thereby making it easier to insert the optical fibers into the optical fiber holes 22 when forming an optical connector. Formed in the upper face part of the ferrule 2 is a window hole 25 for injecting an adhesive.

The molding die 1 is constituted by an upper die 10, a lower die 11, and an intermediate die 12. In the intermediate die 12, four optical fiber hole forming pins 126 forming the optical fiber holes 22 of the ferrule 2 are arranged in a projecting fashion between two guide hole forming pins 125 forming the guide holes 21 of the ferrule 2. The pins 125, 126 are sandwiched and held between a pair of holding members 121, 122, whereas the base end part of the optical fiber hole forming pin 126 disposed at the center is further held between holding members 123, 124 which are thinner than the holding members 121, 122 (and held by the holding members 121, 122). Here, the holding members 121, 122 are secured by screwing, for example. Each optical fiber hole forming pin 126 is constituted by a larger diameter part 126b located on the base end part side, and a smaller diameter part 126a disposed at a distal end part of the larger diameter part 126b. The diameter of the smaller diameter part 126a is slightly greater than the outer shape of the optical fiber inserted, whereas the accuracy in the position and angle of this part substantially determines the accuracy in the position and angle of the fiber hole in the ferrule molded. It is preferable for the smaller diameter part 126a to have a length not longer than the minimum length required for securing the angle of the optical fiber inserted, since the fiber inserting characteristic and the strength of molded pins may deteriorate if this part is too long.

Figure 3:
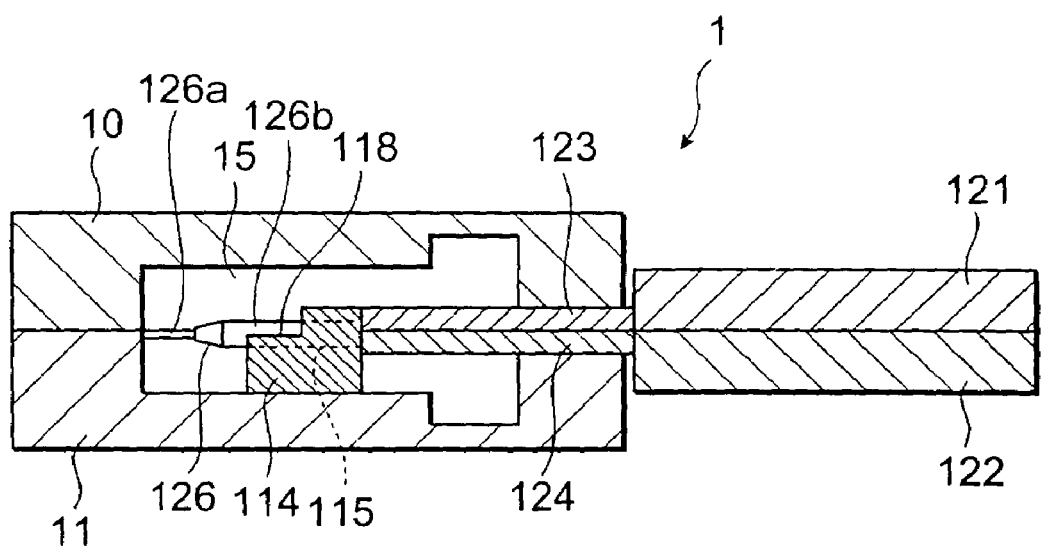
FIG. 3 is a sectional view of the molding die in FIG. 1.

As shown in FIG. 3, the upper die 10 and lower die 11 hold the intermediate die 12 therebetween and form a space (cavity) 15 into which a resin is introduced. V-grooves 112 for positioning the respective guide hole forming pins 125 are formed on both end parts of the lower die 11. V-grooves 113 for positioning the respective optical fiber hole forming pins 126 are formed between the V-grooves 112 in the lower die 11 at one end part, whereas a container recess 119 for positioning the holding parts 123, 124 is formed at the other end part.

Disposed at the center of the lower die 11 is a protrusion 114 for forming the window hole 25 of the ferrule 2 for injecting the adhesive. The protrusion 114 is provided with four through holes 115 through which the respective optical fiber hole forming pins 126 are inserted. At the upper end part of the protrusion 114, a cutout 118 is formed on the V-groove 113 side, whereby each through hole 115 is shaped into an U-groove with its upper part opening on the V-groove 113 side. At both end parts of the upper die 10, grooves 101 for pressing and securing the respective guide pins 125 against the lower die 11 are arranged.

When molding the ferrule 2 by using such a molding die 1, the guide hole forming pins 125 and optical fiber hole forming pins 126 are initially held by the holding members 121, 122. Here, the holding parts 123, 124 holding the optical fiber hole forming pins 126 between the guide hole forming pins 125 may be either a member separated from and held by the holding members 121, 122 or a part of an extension of the holding members 121, 122. Subsequently, the guide hole forming pins 125 are placed in the corresponding V-grooves 112 in the state shown in FIG. 1, and the intermediate die 12 is pushed toward the distal ends of the guide hole forming pins 125 and optical fiber hole forming pins 126, so that the optical fiber hole forming pins 126 are inserted through the through holes 115 formed in the protrusion 114 of the lower die 11. Then, the distal end faces (on the side where the optical fiber hole forming pins 126 project) of the holding parts 123, 124 of the intermediate die 12 are brought into contact with the end face of the protrusion 114 on the container recess 119 side, and the distal end parts of the optical fiber hole forming pins 126 are placed in the V-grooves 113. Here, the distal end parts of the guide hole forming pins 125 are placed in their corresponding V-grooves 112 holding the V-grooves 113 therebetween. In this state, the upper die 10 and lower die 11 are closed together as shown in FIG. 3. Preferably, the upper die 10 and lower die 11 are fixed at this time. The intermediate die 12 may be inserted while the upper die 10 and lower die 11 are lightly closed together, and then the upper die 10 and lower die 11 may be fixed.

Then, the space 15 formed by the upper die 10, lower die 11, and intermediate die 12 is filled with a molten resin. As the molten resin, PPS (polyphenylene sulfide) or the like is used, for example. After the resin within the space 15 is set, the upper die 10 and lower die 11 are released from the fixed state, the intermediate die 12 is pulled out, and then the upper die 10 and lower die 11 are opened, whereby the ferrule 2 shown in FIG. 2 is obtained.

In this embodiment, the optical fiber hole forming pins 126 are fixed while being inserted through the through holes 115 formed in the protrusion 114 projecting from the lower die 11, whereby the optical fiber hole forming pins 126 are reliably secured within the space 15. Their securing positions can be made nearer to the distal end face of the optical fiber hole forming pins 126 than conventionally done.

Figure 29:
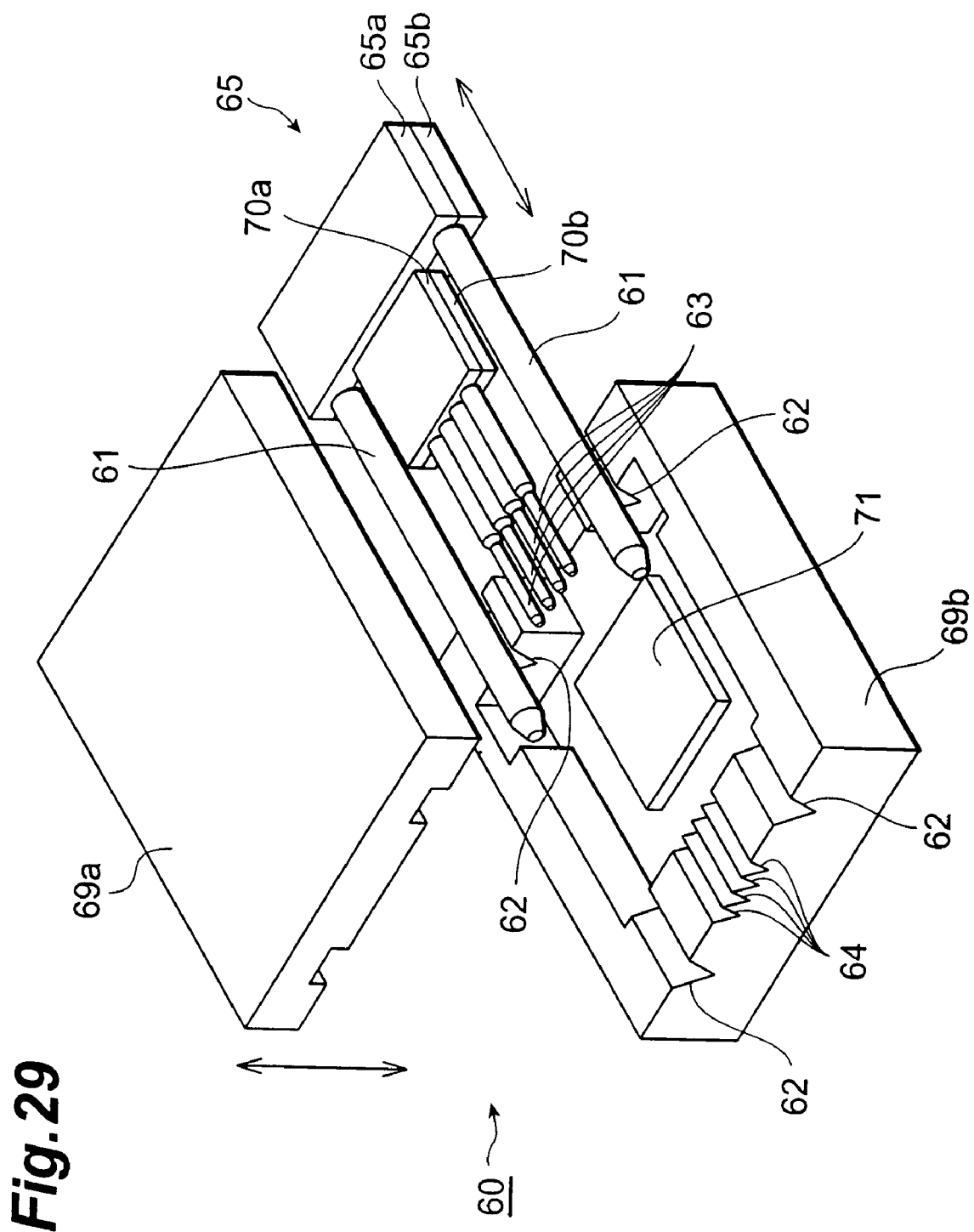
FIG. 29 is a view showing an example of conventional molding die.
Figure 30A:
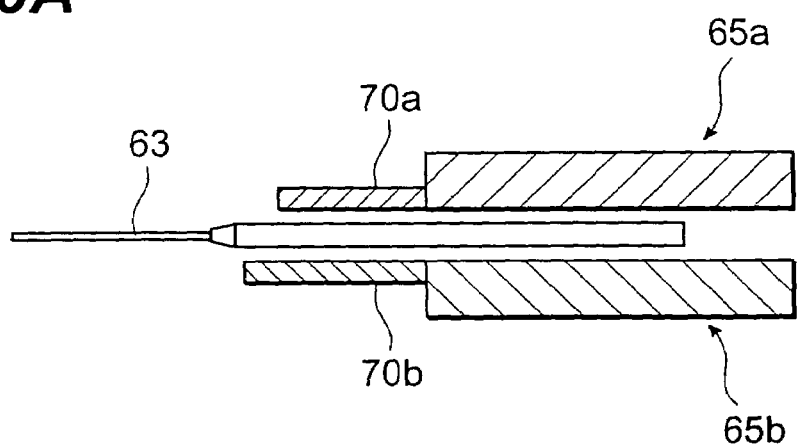
FIGS. 30A, 30B, and 31 are sectional views showing states where arrangements of optical fiber hole forming pins are disordered when molding an optical connector ferrule by using the conventional molding die.
Figure 30B:
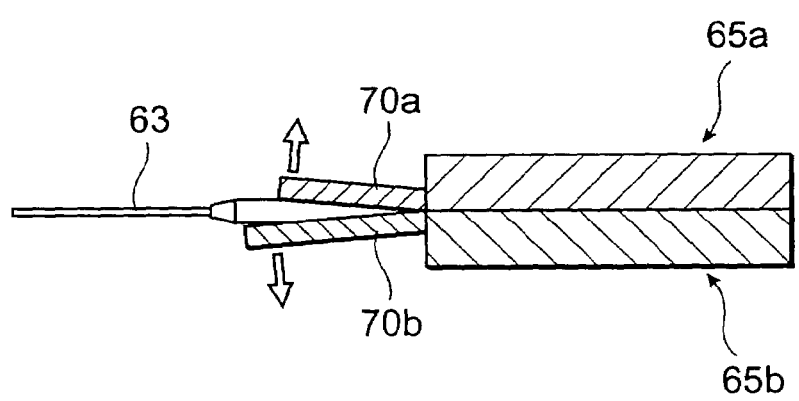
Figure 31:
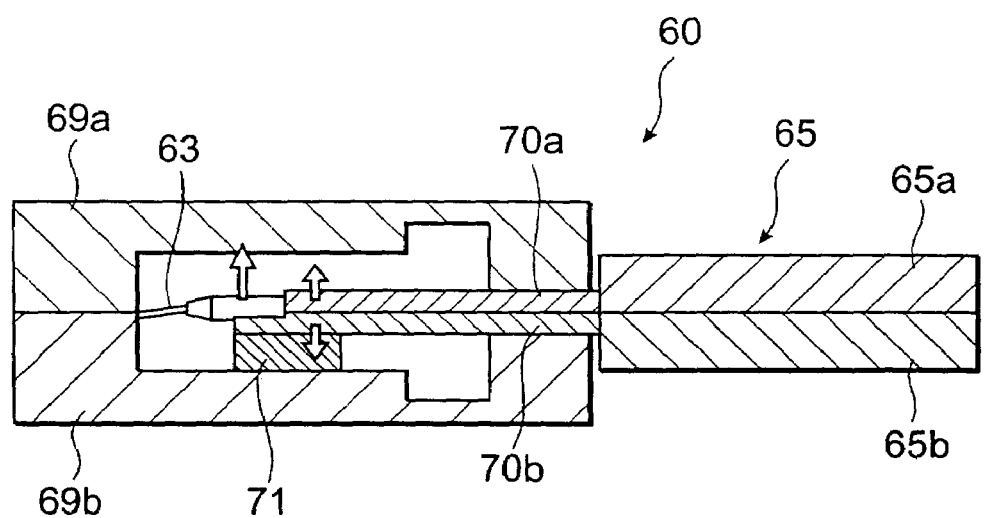

Conventionally, as shown in FIGS. 29 and 31, the base end parts of the forming pins 63 have been held by the holding member 65 movable with respect to the upper and lower dies 69a, 69b, whereby their positional relationships with respect to the distal end positioning parts have been hard to determine accurately. In the present invention, the holding parts on the base end part side of the forming pins 126 become the protrusion 114 and thus do not move with respect to the lower die 11. Since the holding parts are always integrated with the lower die 11, it is quite easy to secure the accuracy in arrangements of the base end parts with respect to the distal end positioning parts. This can restrain the optical fiber hole forming pins 126 from bending and deforming when the space 15 is filled with the molten resin at the time of molding the ferrule 2. Namely, the optical fiber hole forming pins 126 are restrained from disordering their arrangement during molding, whereby the occurrence of bending and deformations in the optical fiber holes 22 can be suppressed in the molded ferrule 2. Therefore, the splice loss of optical fibers does not increase when forming an optical connector by inserting optical fibers into the respective optical fiber holes 22 of the ferrule 2 and then establishing an optical connection by butting the end faces of such optical connectors against each other.

In the conventional molding die, the forming pins 63 are secured by simply being held between the holding members 65a, 65b at the base end parts, whereby it becomes harder for each forming pin 63 to be held stably by an even force as the number of forming pins 63 is increased by a multi-fiber configuration. As a result, the optical fiber holes tend to deform more. In the present invention, the forming pins 126 are independently inserted into and secured by the through holes 115. Therefore, even when the number of forming pins 126 increases, they can be held as reliably as those in the case where their number is smaller.

In the securing by sandwiching alone, it becomes harder to hold forming pins as their pin diameter is smaller. The present invention uses not only sandwiching but also securing by insertion through the through holes 115, and thus can stably hold the forming pins even when their pin diameter is made smaller. For example, the present invention is suitable for making small-diameter fibers having a cladding diameter of 80 to 100 µm, and connectors including 12 or more fibers such as extra multi-fiber connectors, e.g., one-dimensional 16-fiber connectors, which have come into wider use recently.

In particular, the present invention is suitable for MT connectors known as those of ultra low loss grade. The ultra low loss grade is based on a loss compensation of 0.35 dB in the case of a one-dimensional connector in which optical fibers are arranged in one row, and a loss compensation of 0.5 dB in the case of a two-dimensional connector in which optical fibers are arranged in a plurality of rows. The present invention can stably make an optical connector having such a low loss.

The present invention secures the forming pins 126 by using the protrusion 114 for forming the window hole 24 provided at the center of the body and employed for filling the fiber inserting position with the adhesive in an MT ferrule or the like. The window hole 24 is disposed at substantially the center part of the body, whereby the optical fiber holes 22 can be made accurately. Though the forming pins 126 can be secured at other locations, this is not preferable from the viewpoint of distortions upon shrinkage. Preferably, the forming pins are secured at their larger diameter parts in order to enhance the strength at the securing part.

Since the upper face part of the protrusion 114 is provided with the cutout 118, the optical fiber groove 23 can be formed in front of the optical fiber holes 22 in the molded ferrule 22, which makes it easier to insert optical fibers when forming an optical connector.

When molding the ferrule 2 by the molding die 1, the resin slightly intrudes into the boundary part between the protrusion 114 and the holding parts 123, 124, whereby a projection, i.e., line, is formed by thus intruded resin on the floor 24 of the molded optical connector ferrule 2. Though this line is a slight projection which is negligible in terms of functions of the ferrule, it can easily be distinguished therefrom whether the ferrule 2 is molded by using the molding die 1 of this embodiment or not. Though the ferrule is usable even when the holding parts 123, 124 are not in contact with the protrusion 114, this complicates the inner structure and deteriorates the fiber inserting characteristic, whereby it is usually preferable for them to be in contact with each other.

Second Embodiment

Figure 4:
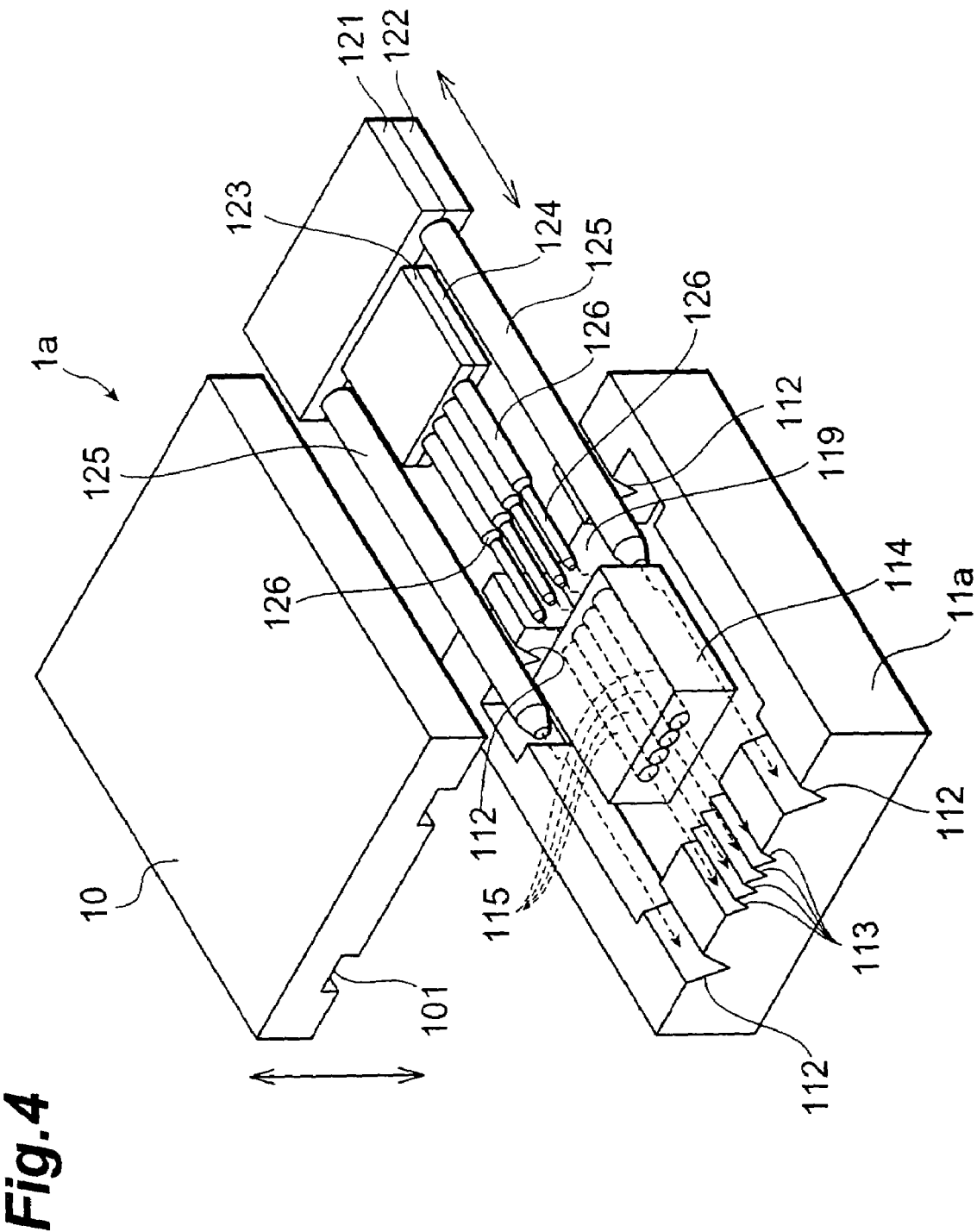
Figure 5:
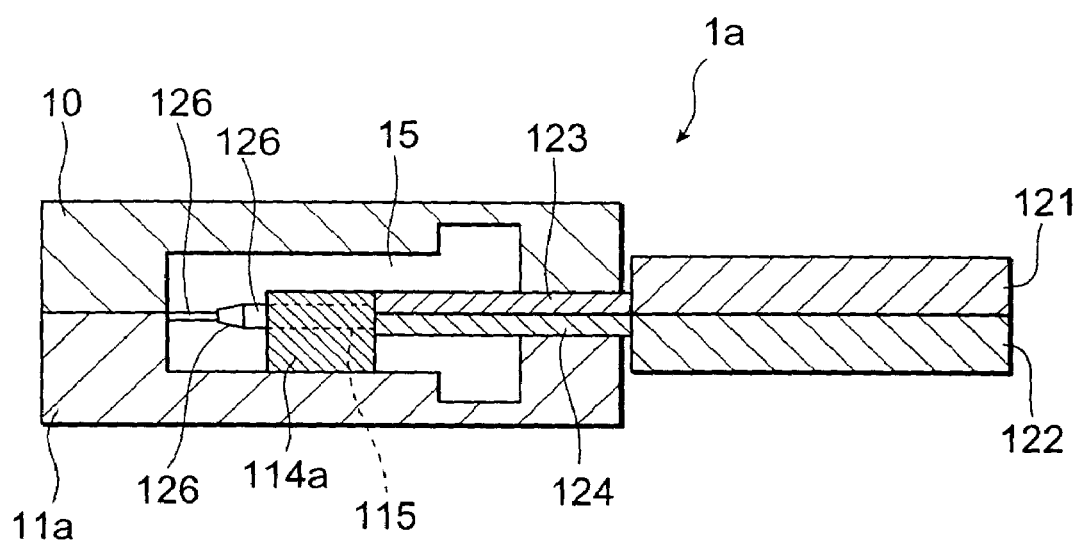
FIG. 5 is a sectional view thereof.
Figure 6:
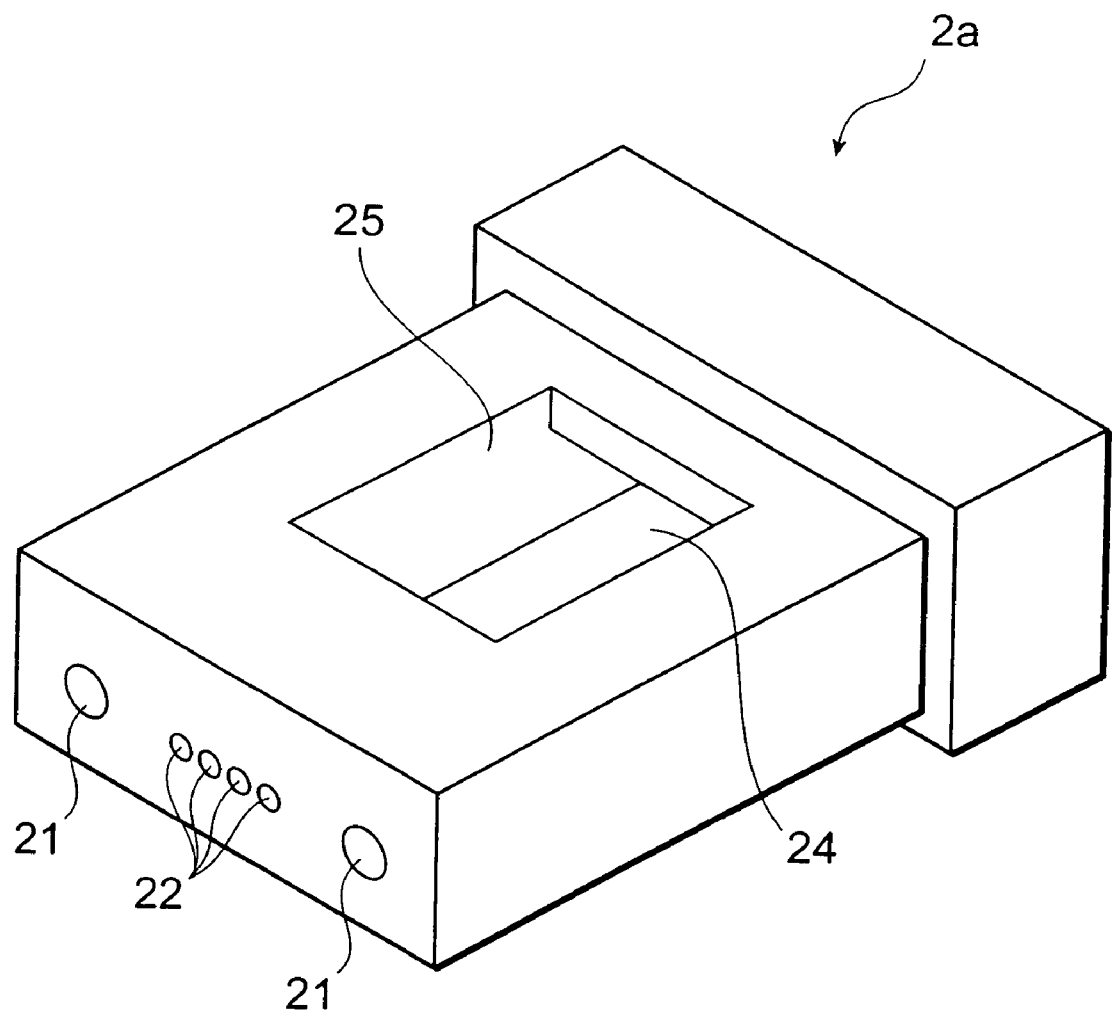
FIG. 6 is a perspective view showing an example of multi-fiber MT optical connector ferrule molded by using the optical connector ferrule molding die shown in FIG. 4.

FIGS. 4 and 5 are an exploded perspective view and a sectional view which show a second embodiment 1a of the molding die in accordance with the present invention. FIG. 6 is a perspective view showing a ferrule 2a molded by this molding die 1a.

As shown in FIG. 6, the ferrule 2a molded by the molding die 1a of this embodiment is not provided with the optical fiber groove 23 communicating with the optical fiber holes 22 unlike the ferrule 2 shown in FIG. 2. Namely, the floor 24 within the window hole 25 becomes flat. The molding die 1a of this embodiment is identical to the molding die 1 of the first embodiment in terms of the upper die 10 and intermediate die 12, but differs therefrom in terms of the configuration of the lower die 11a. The lower die 11a differs from the lower die 11 of the molding die 1 only in that the protrusion 114a has no cutout. Namely, the through holes 115 penetrate through the protrusion 114a.

When such a molding die 1a is used, the optical fiber holes 22 of the ferrule 2a shown in FIG. 6 can be made accurately, whereby effects similar to those of the molding die 1, making method, and ferrule of the first embodiment can be obtained.

Third Embodiment

Figure 7:
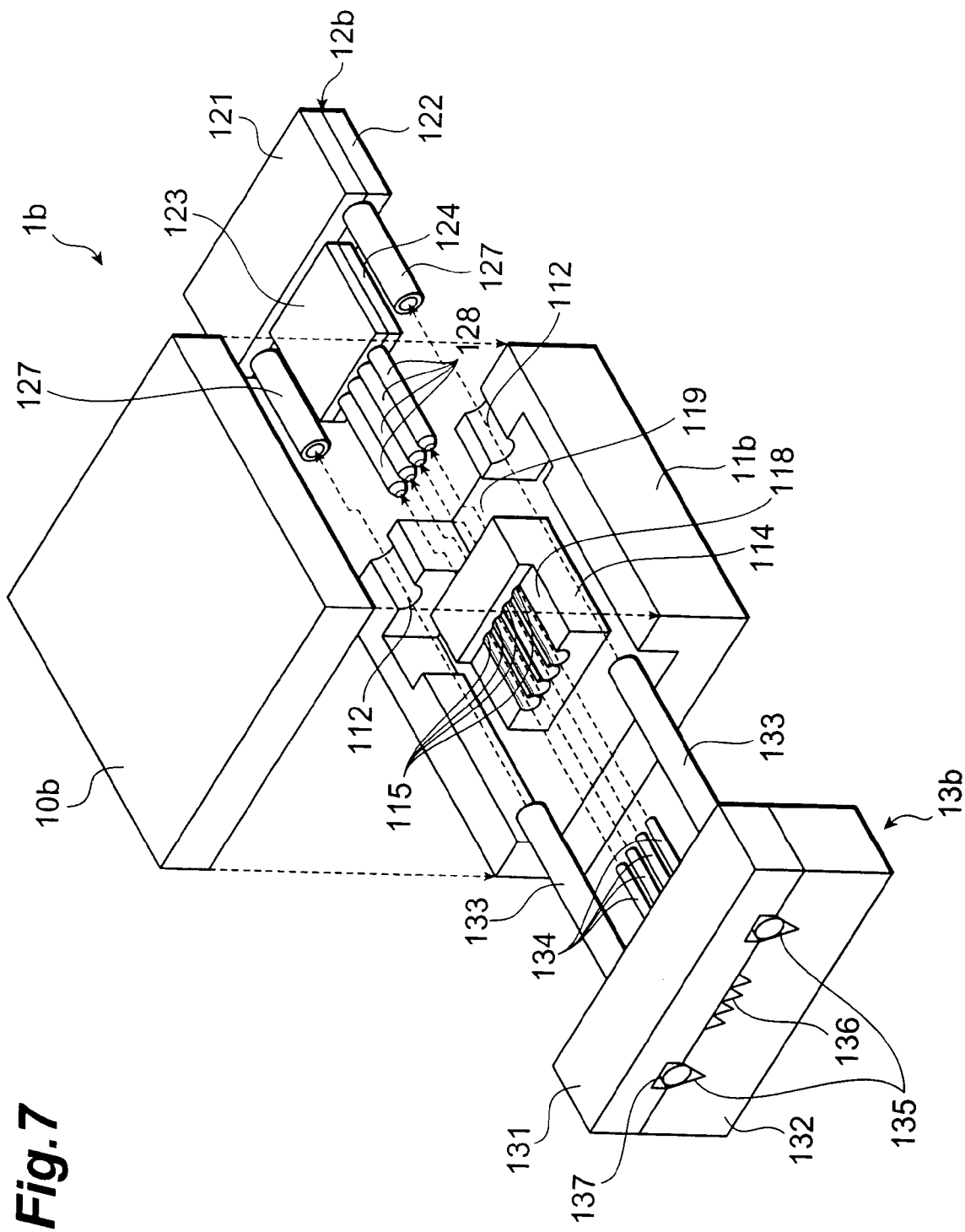

FIG. 7 is an exploded perspective view showing a third embodiment 1b of the molding die in accordance with the present invention. The greatest difference of the molding die 1b from the first and second embodiments 1, 1a lies in that intermediate dies 12b and 13b having a separable structure are employed. The ferrule made by this die 1b is the same as that made by the molding die 1 of the first embodiment, and has the configuration shown in FIG. 2.

The first intermediate die 12b employs a configuration similar to that of the base end parts of the intermediate dies 12, 12a of the first and second embodiments. Specifically, a pair of holding members 123, 124 project between two guide pin pipes 127 held by a pair of holding members 121, 122, while having distal end parts holding four forming pin holding pipes 128. Each guide pin pipe 127 has an outer shape in conformity to the base end part of the guide hole forming pin 125 in the intermediate dies 12, 12a of the first and second embodiments, whereas each forming pin holding pipe 128 has an outer shape in conformity to the larger diameter part 126b of the base end part of the optical fiber hole forming pin 126 in the intermediate dies 12, 12a, each being formed like a pipe.

The second intermediate die 13b has a configuration similar to that of the distal end parts of the intermediate dies 12, 12a, upper die 10, and lower dies 11, 11a of the first and second embodiments. Specifically, it has a configuration in which four optical fiber hole forming pins 134 are held between two guide hole forming pins 133 while being sandwiched between a pair of holding members 131, 132. Each guide hole forming pin 133 is secured by a V-groove 135 of the holding member 132 and a groove 137 of the holding member 131, whereas each optical fiber hole forming pin 134 is secured by a V-groove 136 of the holding member 132 and the bottom face of the holding member 132. This structure corresponds to the relationship between the upper die 10 and lower die 11 in FIG. 1.

The upper die 10b and lower die 11b basically have respective structures in which the sides of V-grooves 112, 113 are eliminated from the upper die 10 and lower die 11 in FIG. 1.

When molding the ferrule 2 by using the molding die 1b, the guide pin pipes 127 and forming pin holding pipes 128 are initially held by the holding members 121, 122. Subsequently, the forming pin holding pipes 128 are inserted into their corresponding through holes 115 formed in the protrusion 114 of the lower die 11b, so as to bring the distal end faces of the holding members 123, 124 into contact with the end face of the protrusion 114 on the container recess 119 side. This places the guide pin pipes 127 into U-grooves 12 of the lower die 11b. Here, the length ($\alpha$ in FIG. 8) by which the cylindrical part of each forming pin holding pipe 128 on the base end side projects from the protrusion 114 is preferably about 1 mm. When the projection length of the forming pin holding pipes 128 is 1 mm or less, damages to the forming pin holding pipes 128 at the time of manufacture can be reduced more effectively.

Figure 8:
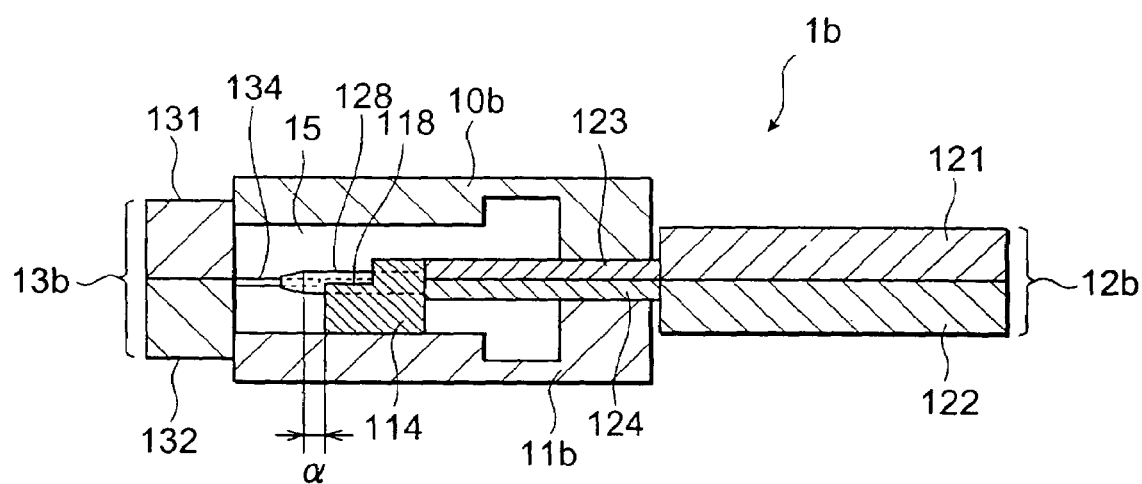
FIG. 8 is a sectional view thereof.

Subsequently, the second intermediate die 13b is inserted into the lower die 11b so as to oppose the first intermediate die 12b. Specifically, the guide hole forming pins 133 and optical fiber hole forming pins 134 are inserted into the guide pin pipes 127 and forming pin holding pipes 128, respectively. In this state, the upper die 10b and lower die 11b are closed as shown in FIG. 8. The order of assembling the dies is not restricted to the one mentioned above. The second intermediate die 13b may initially be secured to the lower die 11b, or the intermediate dies 12b, 13b may be inserted after closing the upper die 10b and lower die 11b.

Then, a cavity 15 formed within thus assembled molding die 1b is filled with a molten resin. After the resin within the cavity 15 is set, the intermediate dies 12b, 13b are separated from the assembled molding die 1b, and the upper die 1a and lower die 10b are opened. Thus the ferrule 2 shown in FIG. 2 is obtained.

The forming pin holding pipes 128 are supported by the through holes 115 of the protrusion 114 positioned at the center part of the lower die 11b during molding the ferrule 2 in this embodiment as well, which can restrain the forming pin holding pipes 128 and the optical fiber hole forming pins 134 inserted and supported therein from deforming when filling the cavity 15 with the molten resin, and thus can suppress the disorder in arrangements of the optical fiber holes 22 in the ferrule 2 manufactured. Therefore, the optical fiber connector using this ferrule can achieve a low splice loss. Also, it can lower the stress caused by the resin flow in the forming pin holding pipes 128, thereby reducing damages thereto.

Since the optical fiber hole forming pins 134 are held on the connecting end face side of the ferrule molded, this embodiment can make the ferrule with a high accuracy in optical fiber hole positions at the connecting end face.

Fourth Embodiment

Figure 9:
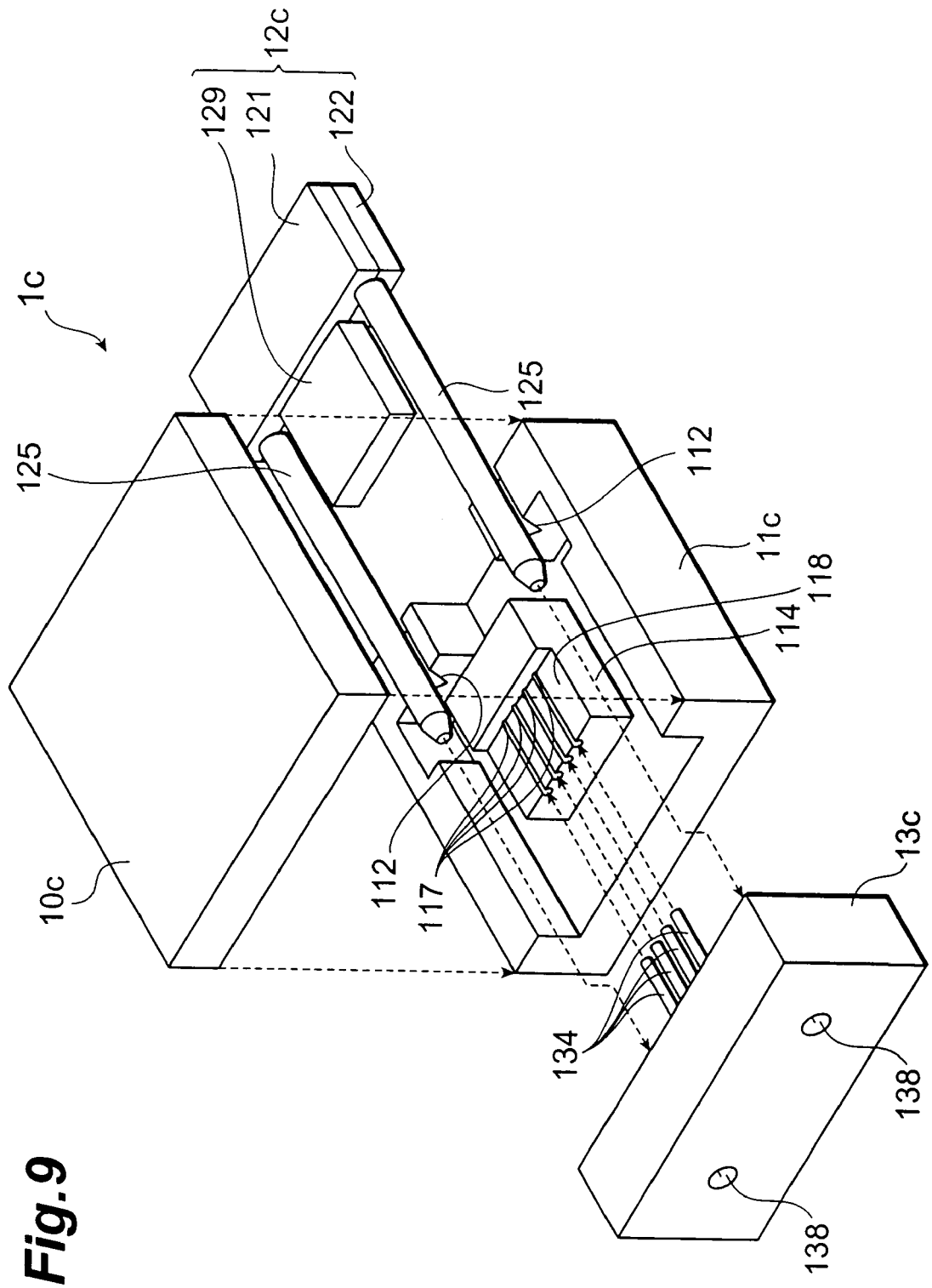

FIG. 9 is an exploded perspective view showing a fourth embodiment of the molding die in accordance with the present invention. This molding die 1c is used for molding a ferrule having a configuration similar to that of the ferrule 2 shown in FIG. 2. However, the ferrule molded by the molding die 1c differs from the ferrule shown in FIG. 2 in that each of optical fiber grooves 23 communicating with the respective optical fiber holes 22 is formed with the same diameter as that of each optical fiber hole 22.

As with the molding die 1b of the third embodiment, the molding die 1c comprises two intermediate dies 12c, 13c. On both sides of an abutment member 129 for forming a coated optical fiber inserting hole at the terminal end part of the ferrule in the intermediate die 12c, two guide hole forming pins 125 for forming the guide holes 21 of the ferrule are provided, whereas the abutment members 129 and guide hole forming pins 125 are held by a pair of holding members 121, 122.

On the other hand, the second intermediate die 13c holds four optical fiber hole forming pins 134 inserted in their holding holes, whereas guide hole forming pin holes 138 for receiving the guide hole forming pins 125 held by the first intermediate die 12c are provided on both sides of the optical fiber hole forming pins 134.

Figure 10:
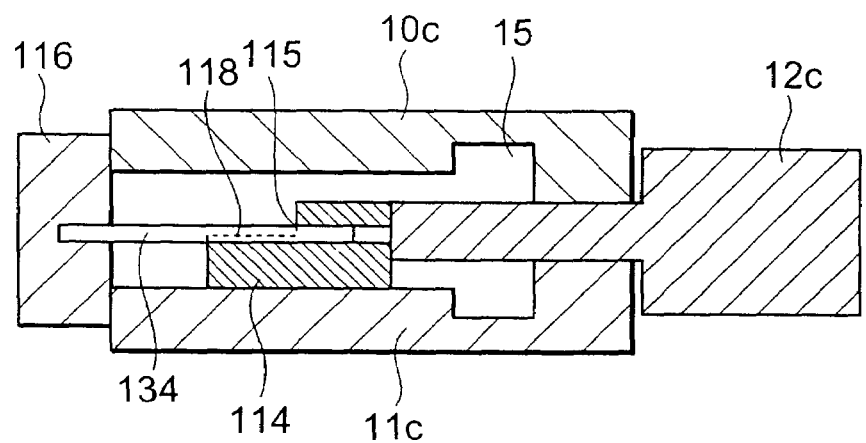
FIG. 10 is a sectional view thereof.

As shown in FIG. 10, the upper die 10c and lower die 11c hold therebetween the guide hole forming pins 125 and abutment members 129 of the first intermediate die 12c and the optical fiber hole forming pins 134 of the second intermediate die 13c, so as to form a cavity 15 into which a resin is injected. An end part of the lower die 11c is formed with V-grooves 112 for positioning the respective guide hole forming pins 125.

The inner face of the lower die 11c is provided with a protrusion 114 for forming a window hole 25 for injecting an adhesive into a ferrule as in other embodiments. The protrusion 114 is provided with four through holes 117 through which the respective fiber hole forming pins 134 are inserted. A cutout 118 is formed on the side where the optical fiber hole forming pins 134 are inserted in the upper end part of the protrusion 114, whereas the through holes 117 in the cutout 118 are formed as U-grooves having an open upper part.

When molding a ferrule by using such a molding die 1c, the holding members 121, 122 initially hold the guide hole forming pins 125 and abutment members 129, so as to produce the first intermediate die 12c. Subsequently, the guide hole forming pins 125 are placed in the V-grooves 112 and are advanced until the distal end faces of the abutment members 129 come into contact with the end face of the protrusion 114 on the V-groove 112 side in the lower die 11c. Then, the second intermediate die 13c is inserted into the lower die 11c so as to oppose the first intermediate die 12c, thereby inserting the optical fiber hole forming pins 134 into the respective through holes 117 provided in the protrusion 114 of the lower die 11c. Further, the second intermediate die 13c is inserted into the lower die 11c, so that the guide hole forming pins 125 are inserted and held in the respective guide hole forming pin holes 138. In this state, the upper die 10c and lower die 11c are closed as shown in FIG. 10, so as to assemble the molding die 1c. Then, the cavity 15 formed within the molding die 1c is filled with a molten resin. After the resin within the cavity 15 is set, the intermediate dies 12c, 13c are slid so as to be separated from the molding die 1c, and the upper die 10c and lower die 11c are opened. This yields a ferrule having a desirable form.

As in the foregoing, the optical fiber hole forming pins 134 are secured and supported by the through holes 117 of the protrusion 114 provided in the lower die 11c in this embodiment as well. Therefore, even when the cavity 15 is filled with a molten resin, the stress caused by the resin flow in the optical fiber hole forming pins 134 is lowered, whereby their deformations are suppressed. Hence, no disorder in arrangements of the optical fiber hole forming pins 134 occurs, whereby bending and deformations in the optical fiber holes 22 in the ferrule 2 obtained by molding can be suppressed. The optical connector using this ferrule can remarkably lower the splice loss of optical fibers.

Fifth Embodiment

Figure 11:
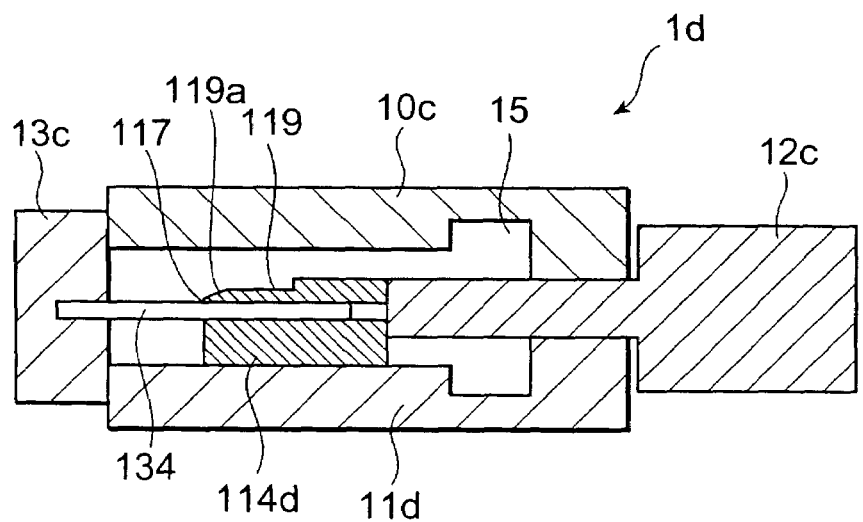
Figure 12:
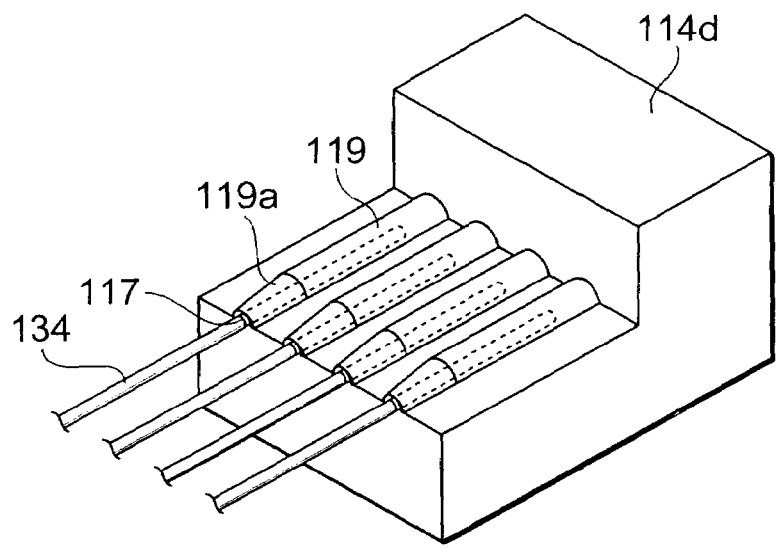
FIG. 12 is a perspective view showing a protrusion thereof.

FIG. 11 is a sectional view showing a fifth embodiment of the molding die in accordance with the present invention, whereas FIG. 12 is a perspective view of its protrusion 114d. The molding die 1d of this embodiment differs from the molding die 1c of the fourth embodiment only in that the configuration of the protrusion 114 of the lower die 11c is modified. The protrusion 114d of this embodiment is provided with raised parts 119 each having a semicircular cross section in conformity to the optical fiber hole forming pin 134 and extending from the through hole 117 in the inserting direction of the optical fiber hole forming pin 134 (toward the first intermediate die 12c). The end part of each raised part 119 has an outer peripheral diameter which tapers down toward the opening end of the through hole 117 so as to form a tapered part 119a toward the opening end. This can make the optical fiber groove 23 in the ferrule 2 wider than the optical fiber hole 22 as shown in FIG. 2 as compared with the case molded by the molding die 1c of the fourth embodiment, and form the bottom face of the groove 23 with a gradient toward the optical fiber hole 22, thereby making it easier to insert optical fibers.

The first and second embodiments are excellent in the productivity of dies since the intermediate die 12 has a simple form. On the other hand, the third to fifth embodiments are excellent in that they can attain a higher accuracy in fiber positions at the end face. In particular, the third embodiment is excellent in that the length of the smaller diameter parts of the forming pins can be optimized without changing the position of the protrusion. The fourth and fifth embodiments are effective when the fiber holes have such a narrow pitch that a pipe having a sufficiently large outer diameter for receiving a forming pin cannot be placed.

Sixth Embodiment

Figure 13:
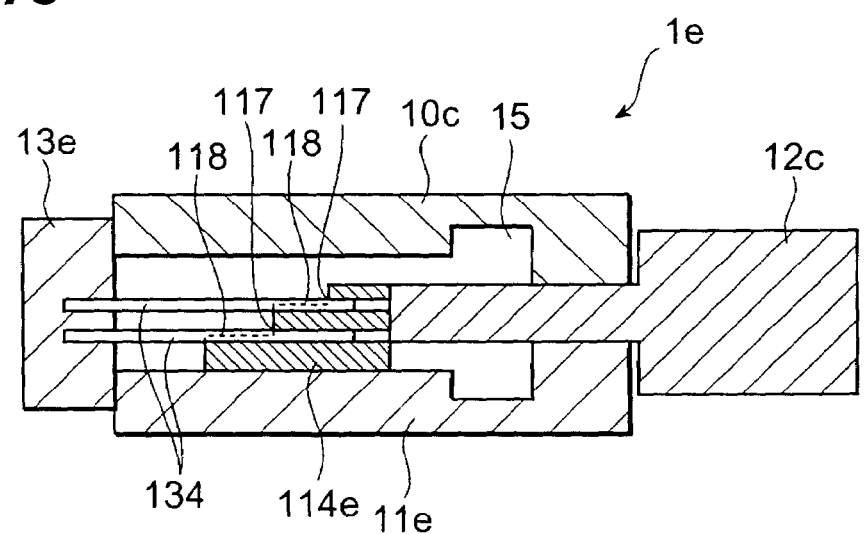
Figure 14:
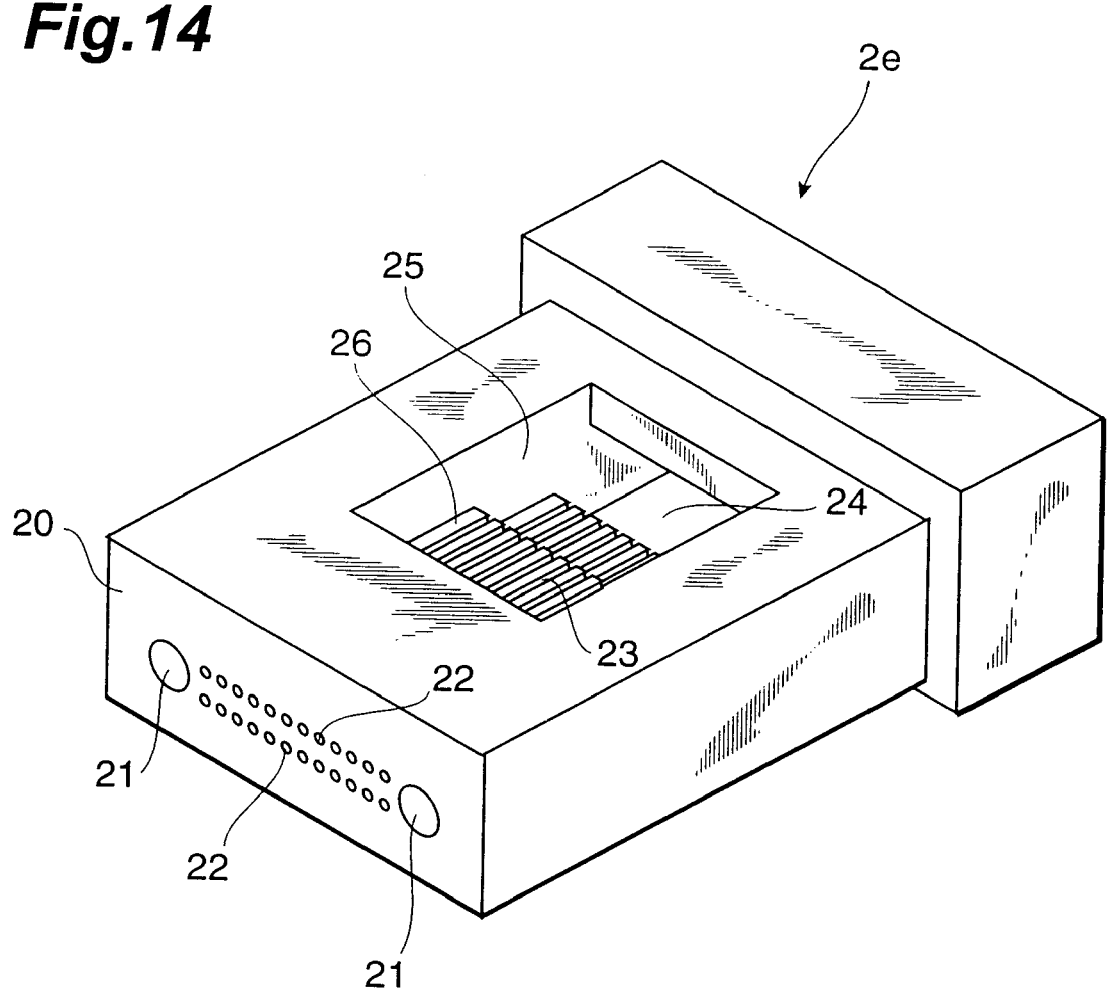
FIG. 14 is a perspective view showing an optical connector ferrule made by this die.

FIG. 13 is a sectional view showing a sixth embodiment 1e of the molding die in accordance with the present invention. Though the first to fifth embodiments relate to molding dies which make an optical connector ferrule in which optical fiber holes 22 are arranged in a single row, this molding die 1e is used for molding an optical connector ferrule 2e in which optical fiber holes 22 are arranged in two stages as shown in FIG. 14.

This molding die 1e has a basic configuration identical to that of the molding die 1c of the fourth embodiment shown in FIGS. 9 and 10. As shown in FIG. 13, the protrusion 114e disposed on the inner face of the lower die 11e is provided with two stages of through holes 117 into which respective optical fiber hole forming pins 134 are inserted. On the side where the optical fiber hole forming pins 134 are inserted in the upper end part of the protrusion 114e, two stages of cutouts 118 are formed. As a consequence, in the cutouts 118, the insertion holes 117 are formed as U-grooves whose upper parts are open.

The method of making a ferrule by the molding die 1e is identical to that of the fourth embodiment, and yields similar effects. This can accurately make the ferrule 2e in which the optical fiber holes 22 are arranged in two stages. Thus, the present invention is suitable not only for the molding of an MT ferrule in conformity to a standard, but also for the molding of various ferrules (e.g., two-dimensional 24-fiber ferrules) having a form similar to that of the MT ferrule with its number of fibers different from that of a standard.

Seventh Embodiment

Figure 15:
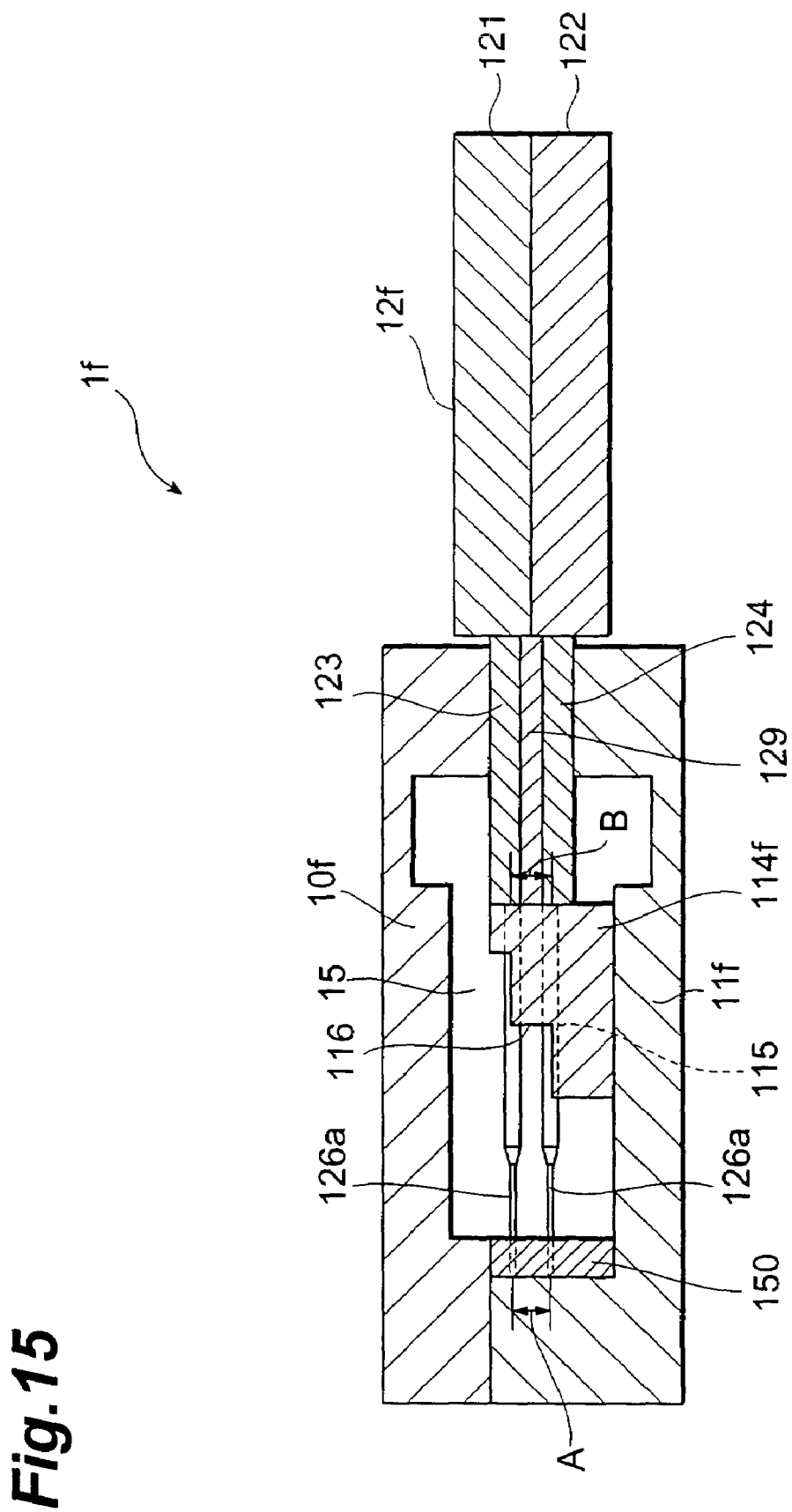
FIG. 15 is a sectional view showing a seventh embodiment of the optical connector ferrule molding die in accordance with the present invention.

FIG. 15 is a sectional view showing a seventh embodiment of the molding die in accordance with the present invention. This molding die 1f molds a ferrule such as the one shown in FIGS. 16 and 17.

This ferrule 2f comprises a pair of guide holes 21 extending from the front end face (connecting end face) 20 toward the rear end and being adapted to receive guide pins (not shown), and a plurality of optical fiber holes 22 (whose number is 24 here) into which optical fibers (see FIG. 21) are inserted. These optical fiber holes 22 are arranged 12 each in two (i.e., upper and lower) stages.

The ferrule 2 has a stepped part 26 therewithin, whereas the upper face part of each step in the stepped part 26 is provided with optical fiber grooves 23 communicating with the respective optical fiber holes 22. The optical fiber grooves 23 act as guide grooves when inserting optical fibers from the rear end side of the optical connector ferrule 2 into the respective optical fiber holes 22 (see FIG. 21), thereby making it easier to insert the optical fibers into the optical fiber holes 22. The upper face part of the optical connector ferrule 2 is formed with a window hole 25 for injecting an adhesive.

When a ferrule molded by using a die having a structure similar to that of the conventional molding die 60 shown in FIG. 29 is used in a case where a plurality of fiber holes are to be provided in a row, the optical fiber holes tend to curve outward more as they are closer to end parts of the arrangement at the front end face (connecting end face) of the optical connector, thereby increasing the splice loss. This embodiment aims at achieving a low splice loss in such a multi-fiber ferrule.

Figure 18:
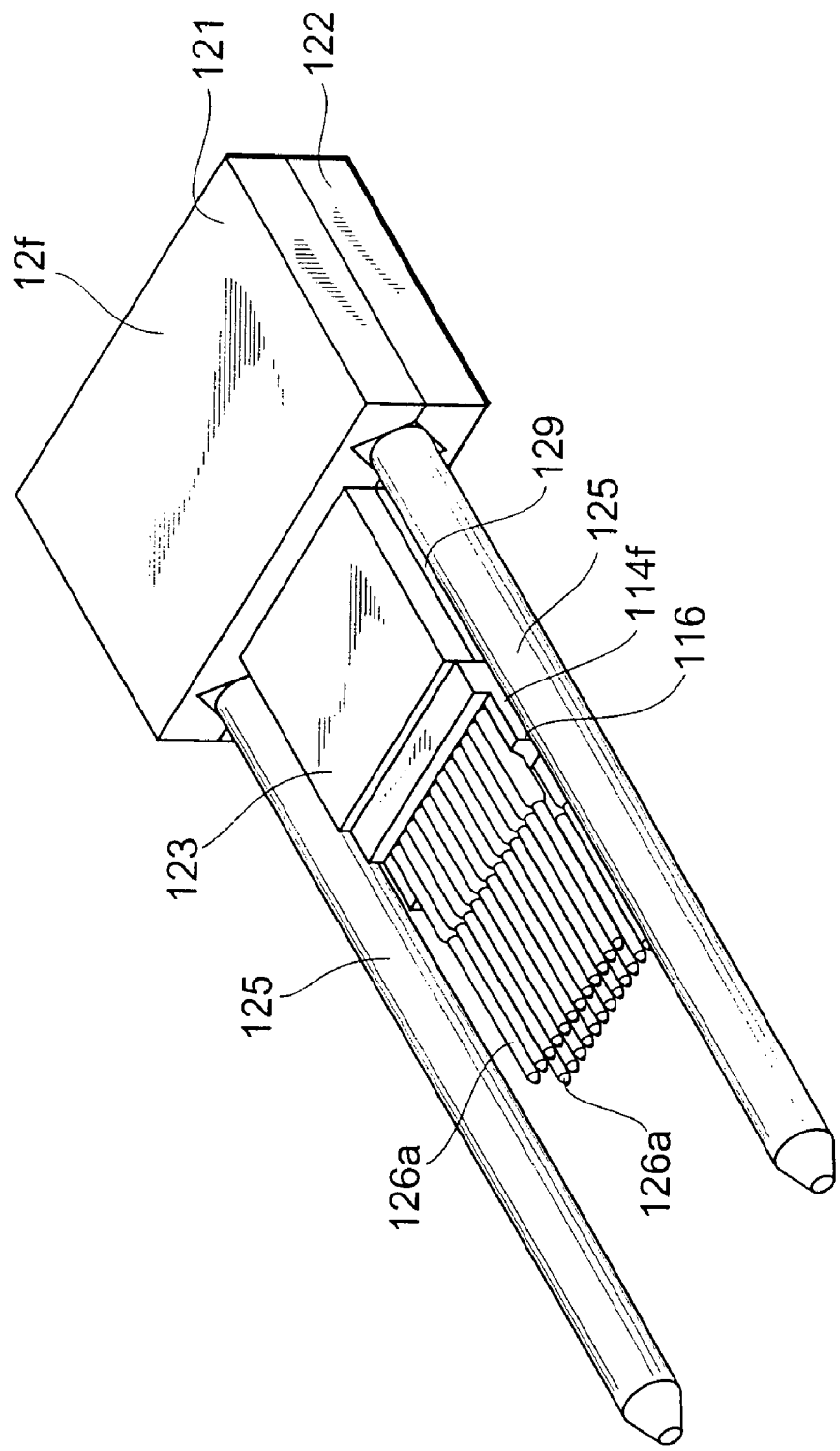
FIG. 18 is a perspective view showing a state where optical fiber hole forming pins shown in FIG. 15 are inserted through respective through holes of a protrusion.

The molding die 1f has basically the same configuration as that of the molding die 1 of the first embodiment. As shown in FIGS. 15 and 18, the intermediate die 12f in the molding die 1f comprises a pair of guide hole forming pins 125 for forming the guide holes 21 of the optical connector ferrule 2, 24 optical fiber hole forming pins 126 for forming the optical fiber holes 22 of the optical connector ferrule 2, holding members 121, 122 for holding the base end side parts of the guide hole forming pins 9, and pin holding parts 123, 124, 129 for collectively holding the base end side parts of the optical fiber hole forming pins 10.

The pin holding parts comprise the upper holding part 123 projecting from the front end face of the upper holding member 121, a lower holding part 124 projecting from the front end face of the lower holding member 122 under the upper holding member 123, and the spacer 129 disposed between the upper holding part 123 and lower holding part 124. The upper holding part 123 and lower holding part 124 are formed with a plurality of V-grooves (not shown) into which base end side parts of the optical fiber hole forming pins 126 are inserted. As a consequence, a plurality of optical fiber hole forming pins 126 are held by the upper holding part 123, the lower holding part 124, and the spacer 129 while in a state arranged in two (i.e., upper and lower) stages.

Figure 19:
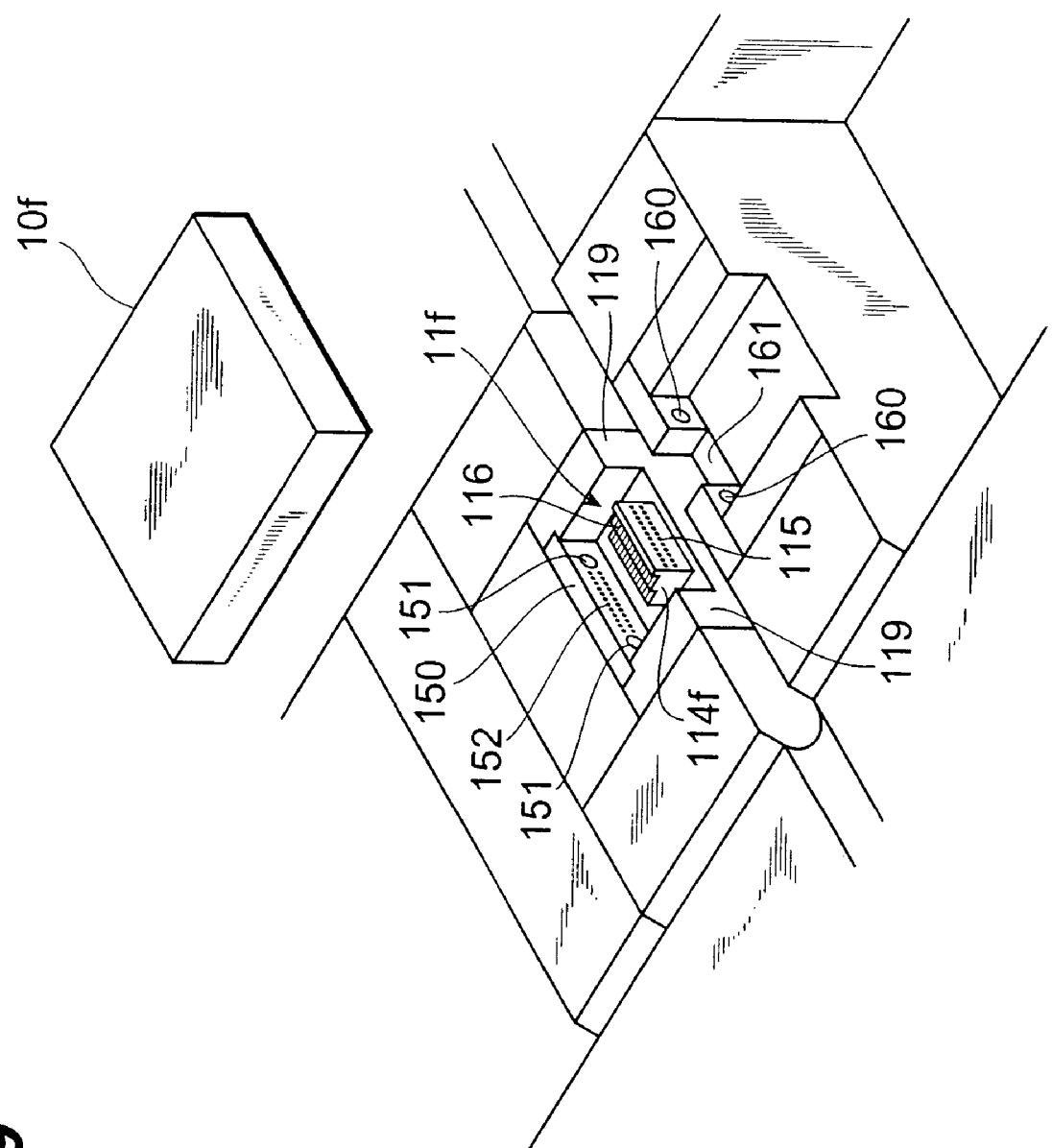

As shown in FIGS. 15 and 19, the molding die 1f comprises an upper die 10f and a lower die 11f, sandwiching therebetween an intermediate die 12f holding the optical fiber hole forming pins 126, for forming a cavity 15 having a form in conformity to the optical connector ferrule 2. Both side parts of the lower die 11f are provided with resin injection gates 119.

The rear end part of the lower die 11f is provided with two positioning holes 160 into which respective guide hole forming pins 125 of the intermediate die 12f are inserted. Formed on the inside of the positioning holes 160 is a guide part 161 for introducing the intermediate die 12f holding the optical fiber hole forming pins 126 into the cavity 15.

The front end part of the lower die 11f is provided with a pin position determining wall part 150 for positioning the distal end parts of the guide hole forming pins 125 and the distal end parts of the optical fiber hole forming pins 126. The pin positioning wall part 150 has two positioning holes 151 for receiving the respective distal end parts of the guide hole forming pins 125, and a plurality of positioning holes 152, disposed between the positioning holes 151, for receiving the respective distal end parts of the optical fiber hole forming pins 126. These positioning holes 152 are arranged in two (i.e., upper and lower) stages.

Here, the vertical arrangement pitch A of the positioning holes 152, i.e., the distance between the center of the positioning holes 152 on the upper stage side and the center of the positioning holes 152 on the lower stage side (see FIG. 15) is 0.5 mm, for example. The lateral (horizontal) arrangement pitch of the positioning holes 152 is 0.25 mm, for example.

The structure for positioning the distal end parts of the optical fiber hole forming pins 126 is not limited to the above-mentioned pin positioning wall part 150 in particular. For example, a plurality of V-grooves into which the distal end parts of the fiber hole forming pins 126 on the lower stage side are inserted may be disposed on the upper face of the lower die 11f, a plurality of V-grooves into which the distal end parts of the fiber hole forming pins 126 on the upper stage side are inserted may be disposed on the lower face of the upper die 10f, and a spacer may be sandwiched between the lower die 11f and upper die 10f. In this case, the grooves formed in the lower die 11f and upper die 10f and the spacer form a hole part for positioning the distal end parts of the optical fiber hole forming pins 126.

Figure 20:
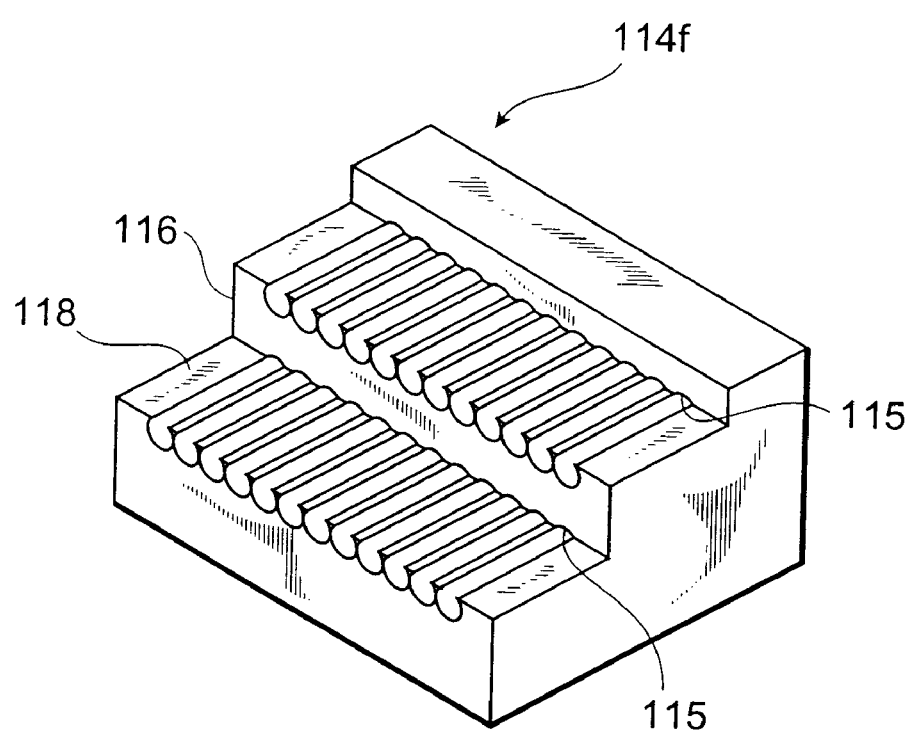
FIG. 20 is a perspective view of the protrusion shown in FIG. 15.

The inner face part of the lower die 11f is provided with a protrusion 14f (see FIG. 20) which forms the window hole 25 for injecting an adhesive in the optical connector ferrule 2. The protrusion 114f is formed with a plurality of through holes 115 into which the respective optical fiber hole forming pins 126 held by the intermediate die 12f are inserted. These through holes 115 are arranged in two (i.e., upper and lower) stages in conformity to the positioning holes 152 of the pin position determining wall part 150. Also, a stepped part 116 is provided on the front end side of the protrusion 114f and lower die 11f. The upper face part of each stage of the stepped part 116 is provided with a plurality of U-grooves communicating with the respective through holes 115.

Figure 21A:
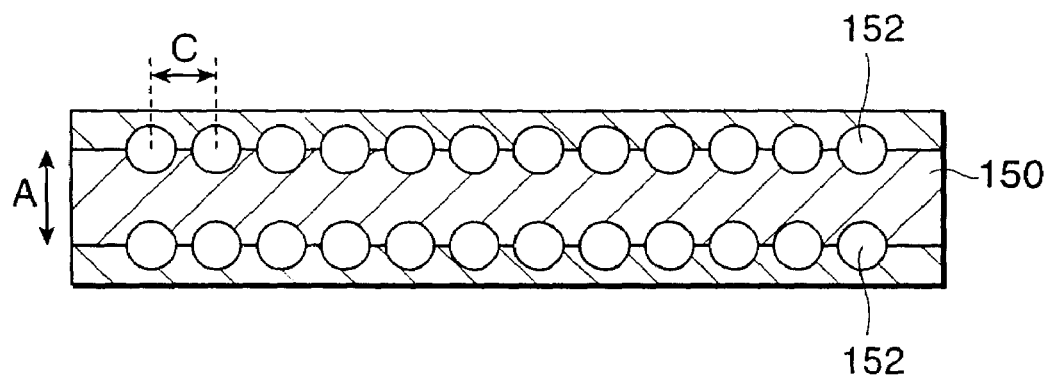
FIGS. 21A and 21B are views for explaining arrangements of positioning holes and through holes.
Figure 21B:
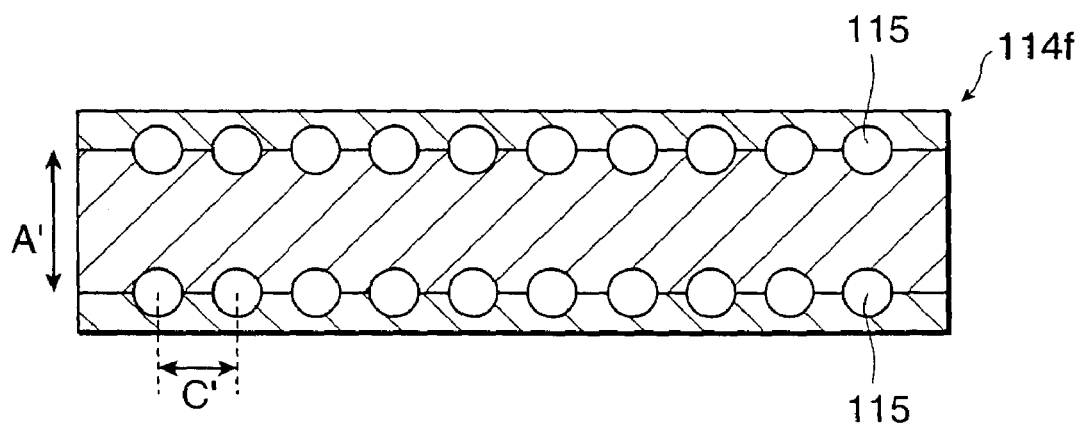

Here, the arrangement pitch of the through holes 115 differs from that of the positioning holes 152 in the pin positioning wall part 150. FIGS. 21A and 21B are views schematically illustrating this fact. Namely, the positioning holes 152 in the positioning wall part 150 are arranged with uniform pitches A and C in the vertical and lateral directions, respectively. In the protrusion 114f, by contrast, arrangement pitches are enlarged to A' and B' in the vertical and lateral directions, respectively. As a result, the through holes 115 corresponding to the positioning holes 152 are arranged such that the distance from their corresponding positioning holes 152 becomes greater as the through hole 115 is farther from the center.

When molding the ferrule 2 by using this molding die 1f, the guide hole forming pins 125 of the intermediate die 12f are passed through the respective positioning holes 160 of the lower die 11f, and the optical fiber hole forming pins 126 are passed through the respective through holes 115 of the protrusion 114f as shown in FIG. 18. Subsequently, the intermediate die 12f is introduced into the lower die 11f such that the distal end faces of the holding parts 123, 124, 129 abut against the rear end face of the protrusion 114f, so as to insert the guide hole forming pins 125 and optical fiber hole forming pins 126 into their corresponding positioning holes 151, 152 of the pin positioning wall part 150. In this state, the upper die 10f and the lower die 11f are closed as shown in FIG. 15.

Subsequently, a molten resin is injected from the resin injection gates 119 into the cavity 15. Since the optical fiber hole forming pins 126 are inserted through the through holes 115 of the protrusion 114f here, the optical fiber hole forming pins 126 are restrained from disordering their arrangements.

Figure 16:
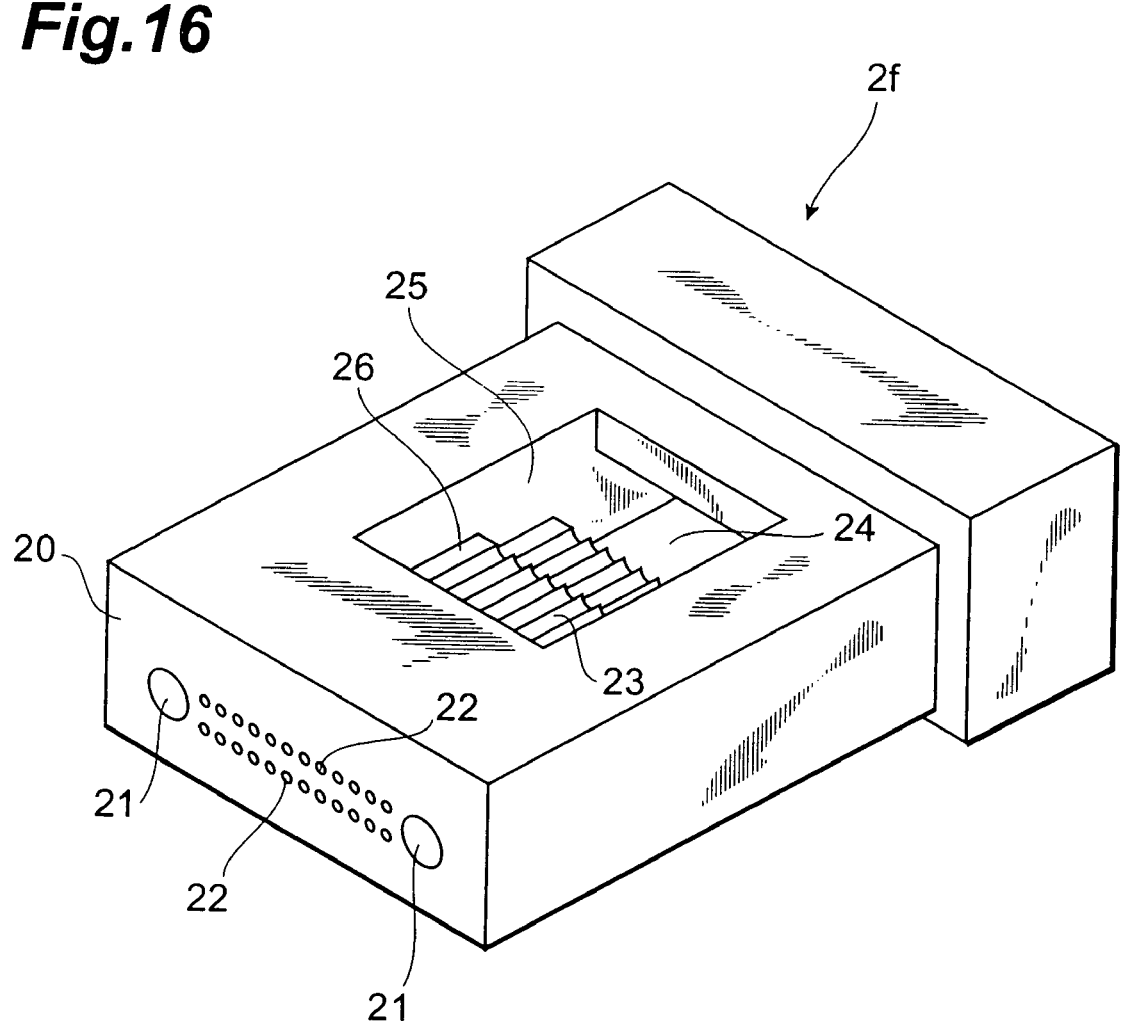
Figure 17:
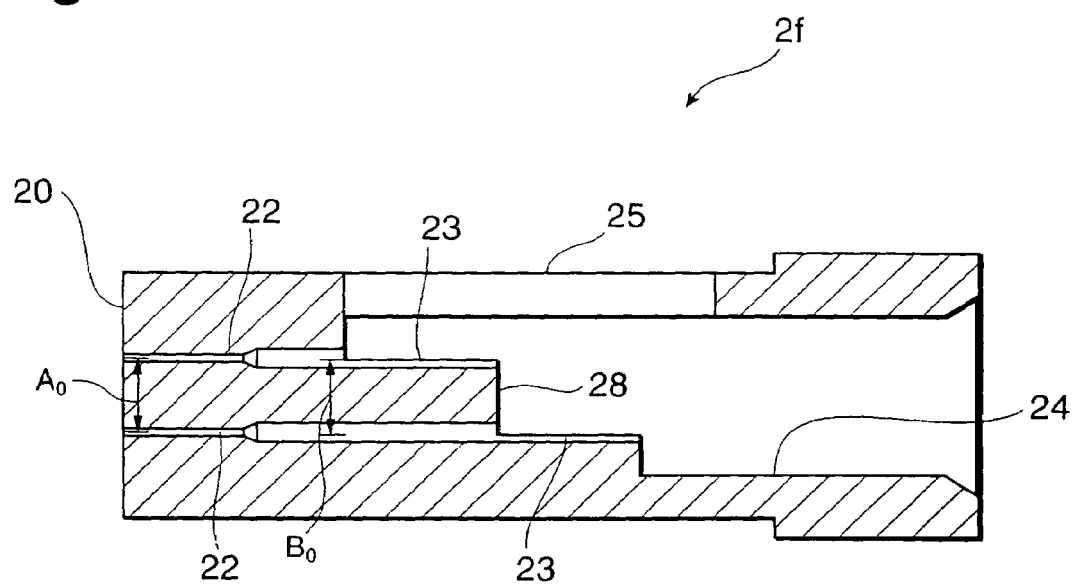
FIG. 17 is a sectional view thereof.

After the resin within the cavity 15 is set, the upper die 10f and the lower die 11f are opened. Then, the intermediate die 12f is moved to the rear side of the lower die 11f, so as to pull the guide hole forming pins 125 and optical fiber hole forming pins 126 out of the lower die 11f. Thus the ferrule 2f as shown in FIGS. 16 and 17 is obtained.

Figure 22:
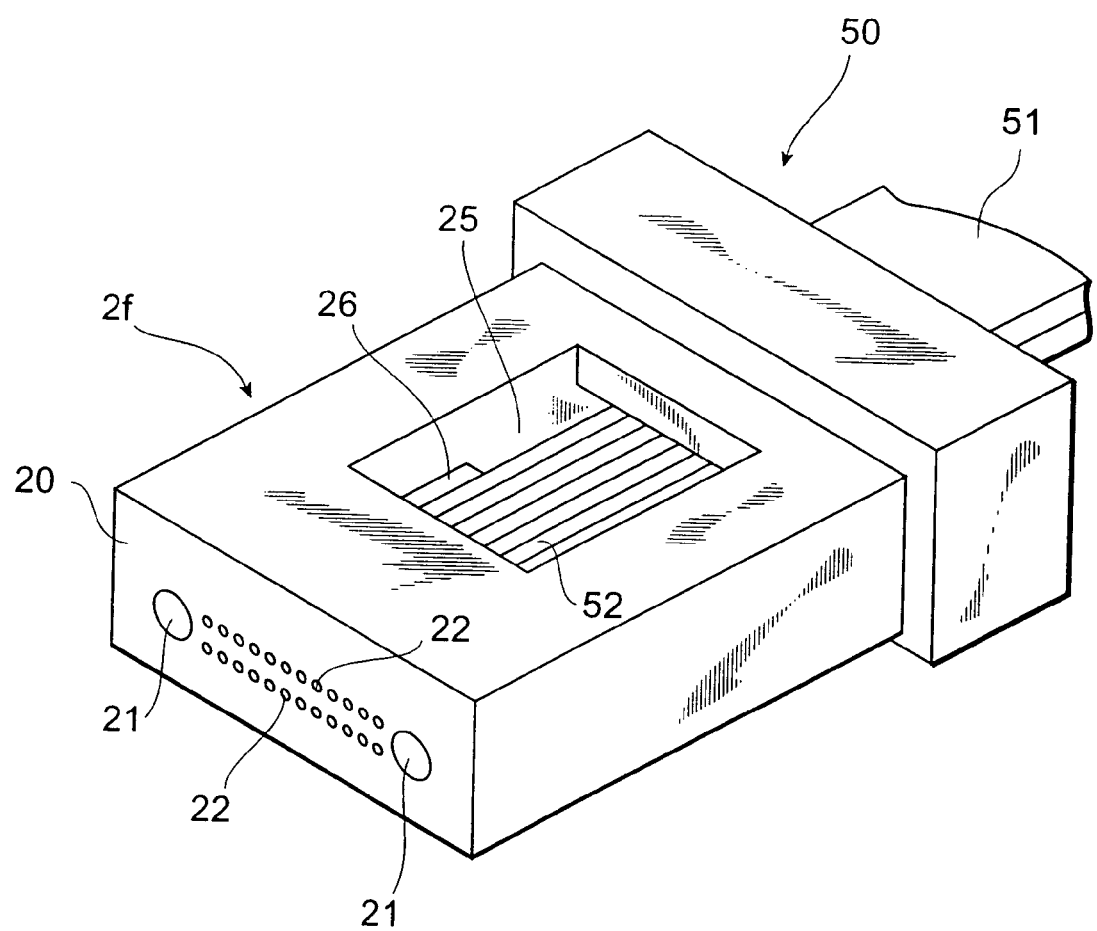
FIG. 22 is a perspective view showing an optical connector using the optical connector ferrule shown in FIGS. 16 and 17.

FIG. 22 is a perspective view showing an optical connector using this ferrule 2f. The optical connector 50 is formed by inserting optical fibers 52 of two multi-fiber (12-fibers here) coated optical fiber tapes 51 into the optical fiber holes 22 of the optical connector ferrule 2f from the rear side. The optical fibers 52 are inserted into their corresponding optical fiber holes 22 while in a state where bare optical fibers are exposed by eliminating the coating at their distal end parts, and then are secured with an adhesive.

When establishing an optical connection by using such an optical connector 50, guide pins (not shown) are inserted into the guide holes 21 of the ferrule 2, and then front end faces 20 of such optical connectors 50 are butted against each other as they are. Alternatively, the ferrule 2f may be provided with a housing so as to form a connector as in MPX and MPO connectors, and then connected to each other.

Figure 23:
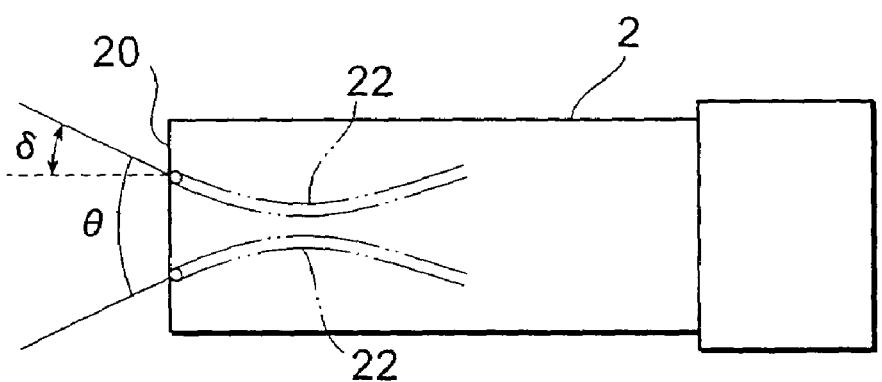
FIG. 23 is a schematic view showing a state where optical fiber holes are bent in a typical optical connector ferrule.

In the ferrule 2f molded by the above-mentioned molding die 1f, the optical fiber holes 22 bend toward each other at their middle part as shown in FIG. 23. This seems be because the space between the optical fiber hole forming pins 126 is so small that the resin is hard to enter there, whereby the resin density in this part becomes lower than that in the surrounding part, thus increasing the shrinkage ratio at the time when the resin sets. When the cavity 15 is filled with the molten resin, the resin initially flows into the side nearer to the ferrule end, whereby the optical fiber hole forming pins 126 receive a pressure directed to the center part of the ferrule. Here, the optical fiber hole forming pins 126 are held at positions to become both end parts of the optical fiber holes, and thus deform so as to flex inward, whereby the optical fiber holes closer to the end sides (outside) deform so as to bend inward more.

Figure 24A:
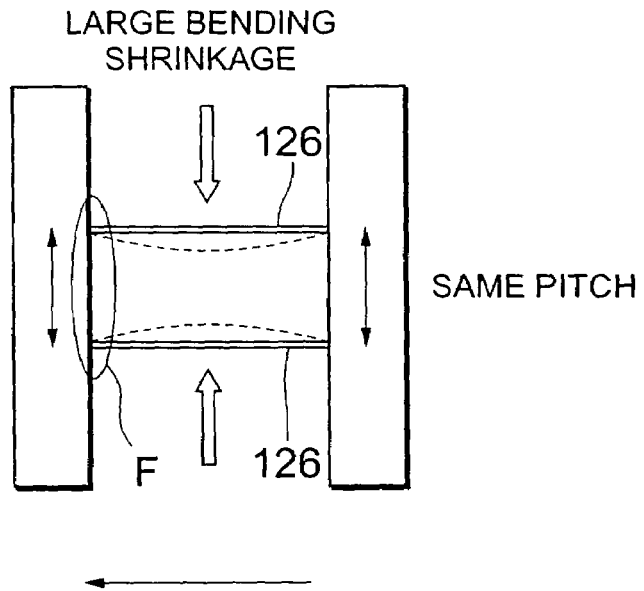
FIGS. 24A and 24B are views showing a principle by which the bending of optical fiber holes shown in FIG. 23 occurs and a comparison therewith, respectively.

As shown in FIG. 24A, when the arrangement pitch of the optical fiber hole forming pins 126 is set identical between the distal end part and base end side of the optical fiber hole forming pins 126 here, the optical fiber holes 21 (corresponding to dotted lines in the drawing) in the front end part of the ferrule 2 (corresponding to the F part in the drawing) bend greater. In this case, the splice loss of optical fibers increases when the front end faces 20 of optical connector ferrules 2 are butted against each other in the state where the optical fibers are inserted in the optical fiber holes 22 so as to establish an optical connection.

In this embodiment, by contrast, the arrangement pitch of the through holes 115 in the protrusion 114f disposed in the inner face part of the lower die 10f is not fixed but set so as to become greater than that of the positioning holes 152 of the pin positioning wall part 150 as the through hole 115 is farther from the center in both vertical and lateral directions as shown in FIG. 21B. Therefore, in the optical connector ferrule 2f molded by the molding die 1f, the arrangement pitch becomes greater on the rear end side than in the front end part.

Figure 24B:
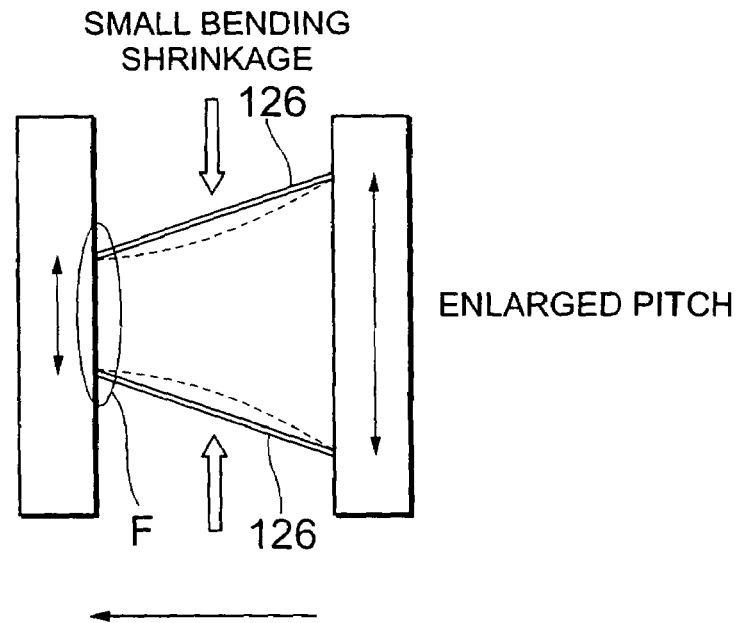
Figure 25:
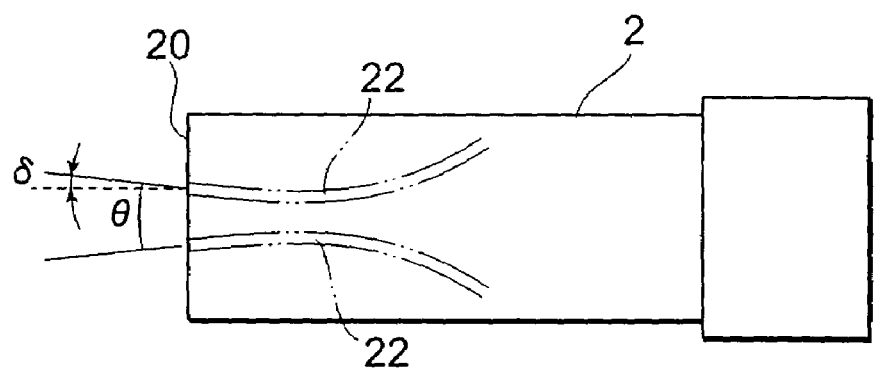
FIG. 25 is a schematic view showing a state where optical fiber holes are bent in the optical connector ferrule shown in FIG. 17.

When the arrangement pitch of the optical fiber hole forming pins 126 is made greater on the base end side than on the distal end side as such, the distal end parts of optical fiber hole forming pins 126 adjacent each other are bent beforehand in directions opposite from the resin shrinking directions as shown in FIG. 24B. Therefore, even if the adjacent optical fiber holes 22 (corresponding to dotted lines in the drawing) bend (flex) such that their middle parts approach each other when the resin shrinks at the time of molding, bends of the optical fiber holes 22 cancel each other out in the important front end part of the ferrule 2 (corresponding to the F part in the drawing). As a result, the optical fiber holes 22 extend substantially straight toward the rear end of the optical connector ferrule 2 in the front end part of the optical connector ferrule 2 as shown in FIG. 25.

Preferably, in an MT ferrule, the vertical and lateral arrangement pitches of the optical fiber hole forming pins 126 are set greater by about 1 to 10 μm in the base end part than in the distal end part. The pitch range depends on the length of the optical fiber holes 22, whereas the value mentioned above is a preferable range in the case where the optical fiber holes 22 have a length of 3 mm. Preferably, the length of the optical fiber holes 22 is set to the range of about 2 to 5 mm. This is because a length less than 2 mm makes it harder to secure an arrangement accuracy between the base end part and distal end part, increases the window hole 24 too much, and enhances the asymmetry of the ferrule, which may yield a greater molding distortion. On the other hand, a length exceeding 5 mm elongates the span of molding pins, thereby making them easier to deform, and may increase the amount of bending of the pins itself.

Here, the optical fiber holes 22 at the front end face 20 of the optical connector ferrule 2 preferably have a vertical/lateral relative bending angle θ of 0.4° or less. As shown in FIGS. 23 and 25, the relative bending angle θ between the optical fiber holes 22 refers to the angle of intersection between the axes of the optical fiber holes 22 positioned at both ends of the front end face 20 of the optical connector ferrule 2. On the other hand, each optical fiber hole preferably has an angle of emittance δ of 0.2° or less. As shown in FIGS. 23 and 25, the angle of emittance δ refers to the angle of intersection between a normal and the axis of the optical fiber hole 22 at the front end face 20 of the optical connector ferrule 2.

The loss due to such angular deviations can be determined by the following equation of Marcuse:

$$T = \left(\frac{2\omega_1\omega_2}{\omega_1^2 + \omega_2^2}\right)^2 \exp\left(-2\frac{(\pi n \omega_1 \omega_2 \Delta\delta)^2}{\lambda^2(\omega_1^2 + \omega_2^2)}\right)$$

where n is the refractive index of the core, λ is the wavelength in vacuum, ω is the mode field diameter=MFD (whose affixes 1 and 2 refer to the exit and entrance sides, respectively), and Δδ is the amount of angular deviation. When a usually employed GeSM optical fiber having an MFD of 4.6 μm is used, the relationship between the angular deviation and splice loss is as summarized in the following table.

|  | angular deviation (°) | | | | | |
| --- | --- | --- | --- | --- | --- | --- |
|  | 0 | 0.1 | 0.2 | 0.3 | 0.4 | 0.5 |
| splice loss (dB) | 0.0 | 0.003 | 0.013 | 0.030 | 0.053 | 0.083 |

For achieving a splice loss of less than 0.35 dB, which is known as ultra low loss grade, the increase in loss due to the angular deviation is preferably about 0.05 dB or less, for which the angle of emittance δ at the end face of the optical connector is required to be less than 0.2°. The present invention can accurately realize such an angle of emittance δ.

Suppressing the bending of the optical fiber holes 22 at the front end part of the optical connector ferrule 2 as such reduces the splice loss of optical fibers 52 when establishing an optical connection by butting the front end faces 20 of optical connectors 50, each employing such a ferrule, against each other.

Also, as shown in FIG. 25, the distance between the upper and lower optical fiber holes 22 on the rear end side of the ferrule 2 can be expanded without increasing the relative bending angle θ of the optical fiber holes 22 at the front end face 20 of the ferrule 2. Therefore, when inserting the optical fibers 52 of the coated optical fiber tape 51 into the respective optical fiber holes 22 of the ferrule 2 at the time of connection, the upper and lower stages of the optical fiber holes 22 are prevented from being mistaken for each other, whereby the operation time required for connection and the like can be shortened.

Figure 26:
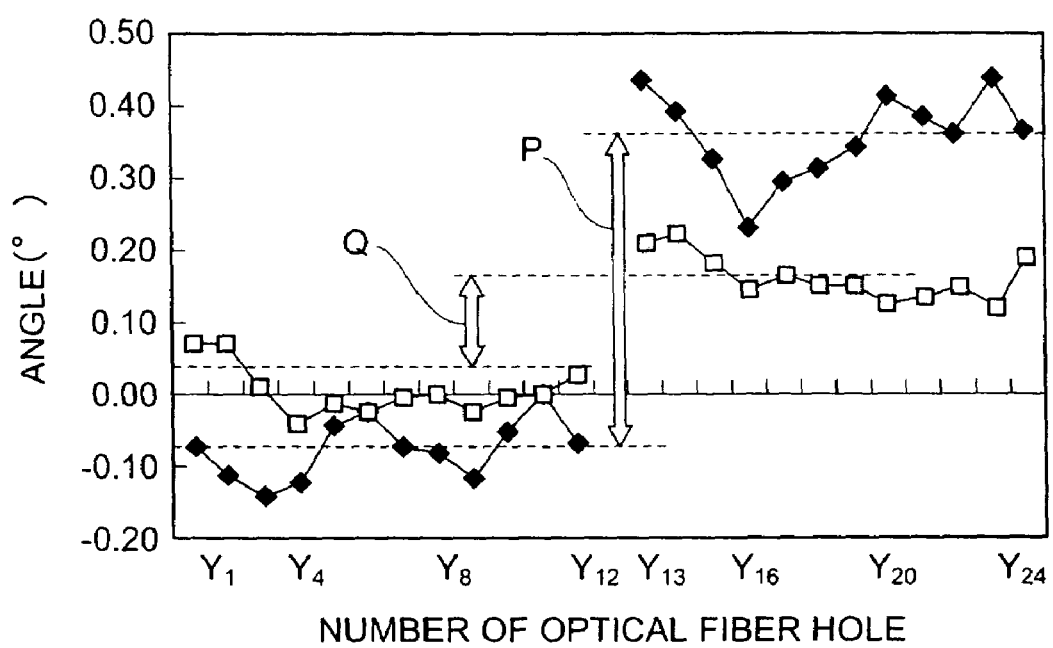
FIGS. 26 and 27 show experimental data indicating relative bending angles in vertical and horizontal directions at the front end face of an optical connector ferrule.
Figure 27:
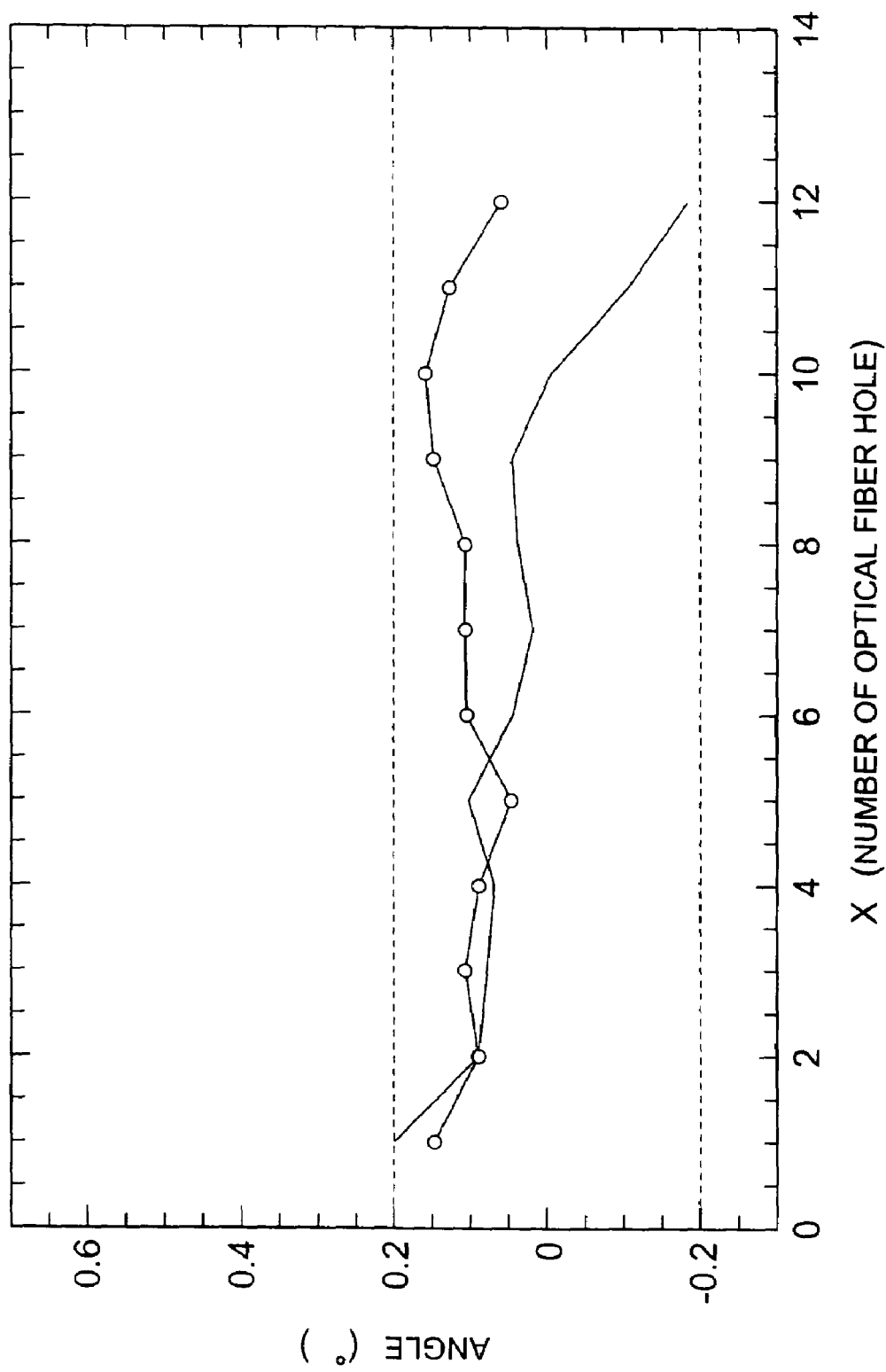

FIG. 26 shows experimental data indicating relative vertical bending angles of optical fiber holes at the front end face of an optical connector ferrule. FIG. 27 shows experimental data indicating relative lateral bending angles of optical fiber holes. In FIGS. 26 and 27, black symbols indicate experimental data obtained when vertical/lateral arrangement pitches of the optical fiber hole forming pins are held constant. White symbols indicate experimental data obtained when the arrangement pitches of optical fiber hole forming pins on the base end side are made greater by 8 μm in the case of vertical direction and 2 μm in the case of lateral direction than those in the distal end part. The abscissa of each graph indicates numbers of optical fiber holes in the optical connector ferrule. In FIG. 26, $Y_1$ to $Y_{12}$ refer to the optical fiber holes on the lower stage side, whereas $Y_{13}$ to $Y_{24}$ refer to the optical fiber holes on the upper stage side. In FIG. 27, $X_1$ to $X_{12}$ refer to the optical fiber holes. The ordinate of each graph refers to the angle of inclination with respect to the normal (center axis) of the end face of the optical connector ferrule.

As can be seen from the graphs, when the arrangement pitches of the optical fiber hole forming pins are held constant, the average value P of relative bending angles θ between the upper and lower optical fiber holes is about 0.44°. In the case where the arrangement pitches of the optical fiber hole forming pins on the base end side are made greater than those in the distal end part, on the other hand, the average value Q of relative bending angles θ between the upper and lower optical fiber holes is about 0.15° and thus is improved greatly.

Figure 28:
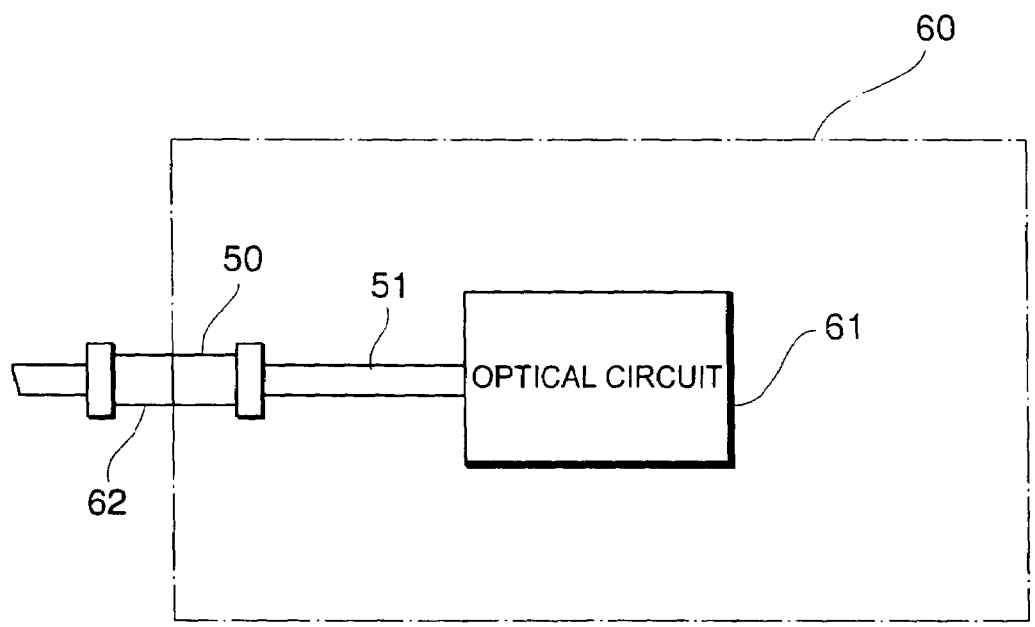
FIG. 28 is a diagram showing an example of optical wiring system comprising the optical connector shown in FIG. 22.

FIG. 28 is a diagram showing an example of optical wiring system comprising the optical connector 50 shown in FIG. 22. In this diagram, the optical wiring system 60 comprises the optical connector 50, and an optical circuit 61 connected to the optical connector 50 via a coated optical fiber tape 51. The optical circuit 61 is constituted by a light-emitting device, a light-receiving device, an optical multi/demultiplexer, an optical branching/combining device, an optical switch, and the like. Thus, the optical wiring system 60 employs the optical connector 50 as an interface, whereas another optical connector 62 is connected to the optical connector 50.

The present invention is not restricted to the above-mentioned embodiments, and modifications combining the embodiments are also included in the scope of the present invention. Though the embodiments in the foregoing explanations are in modes in which the optical fiber holes are arranged in a single row or in two (i.e., upper and lower) stages, the present invention is also applicable to those molding an optical connector ferrule having a plurality of optical fiber holes arranged in three or more stages. The seventh embodiment is favorably applicable to a ferrule in which optical fiber holes are arranged in a single row as well. It is not always necessary for the through holes to be provided one by one. For example, in a configuration in which forming pins are nearly in contact with their adjacent forming pins at larger diameter parts, holes for securing the larger diameter parts are hard to provide one by one, and pins do not shift in the arrangement direction of forming pins even if a hole into which all the forming pins are collectively inserted is provided. In such a case, a continuous hole (having a rectangular or capsule-like cross section) which collectively contains forming pins may be provided. It is important for the present invention to have a configuration which limits the movement of forming pins in directions (vertical and lateral directions) perpendicular to the axial direction in the protrusion.

INDUSTRIAL APPLICABILITY

The present invention is suitable for making an optical fiber connector, and an optical wiring system using this connector.

The invention claimed is:

1. An optical connector ferrule comprising:

a main body comprised substantially of a resin material, wherein the main body comprises a first row of optical fiber holes and a second row of optical fiber holes, wherein the two rows of optical fiber holes are positioned entering a front face of the main body, wherein the first row of holes bends continuously towards the second row of holes as the first row penetrates a first distance into the front face of the main body, and then bends continuously away from the second row as the first row penetrates an additional second distance into the front face of the main body, wherein the main body further comprises a stepped part with a first row of grooves communicating directly with the first row of optical fiber holes, such that the first row of grooves may serve as guide grooves when inserting optical fibers from a rear side of the main body, wherein the main body further comprises a window for injecting adhesive, and wherein the first row of grooves is at least partially visible through the window.

2. The optical connector ferrule of claim 1, wherein every hole of the two rows enters the front face of the main body at an angle of 0.2 degrees or less of deviation from a line normal to the front face.

3. The optical connector ferrule of claim 1, wherein the second row of holes bends continuously towards the first row of holes as the second row penetrates the first distance into the front face of the main body, and then bends continuously away from the first row as the second row penetrates the additional second distance into the front face of the main body.

4. The optical connector ferrule of claim 3, wherein every hole in the two rows bends continuously at not more than 0.2 degrees.

5. The optical connector ferrule of claim 1, wherein the main body is cast as a single unit from resin.

6. The optical connector ferrule of claim 1, wherein the stepped part further comprises a second row of grooves communicating directly with the second row of optical fiber holes, such that the second row of grooves may serve as guide grooves when inserting optical fibers from the rear side of the main body.

7. The optical connector ferrule of claim 1, wherein the first row of holes penetrates a third distance into the first face of the main body to contact the first row of grooves, wherein the second row of holes penetrates a fourth distance into the first face of the main body to contact the second row of grooves, and wherein the fourth distance is greater than the third distance so that the second row of holes extends through the main body under the first row of grooves to contact the second row of grooves.

8. The optical connector ferrule of claim 1, wherein each hole in the first row and the second row penetrates the front face of the main body with a first small diameter for accepting an optical fiber, and then continues penetrating with a second large diameter for accepting an optical fiber with cladding.

9. The optical connector ferrule of claim 8, wherein every hole in the first row penetrates approximately a first row small diameter penetration distance, and then continues penetrating a first row second diameter penetration distance to contact the first row of grooves, and wherein every hole in the second row penetrates approximately a second row small diameter penetration distance, and then continues penetrating a second row large diameter penetration distance to contact the second row of grooves.

10. The optical connector ferrule of claim 9, wherein the first row small diameter penetration distance is approximately equal to the second row small diameter penetration distance, and wherein the second row large diameter penetration distance is greater than the first row large diameter penetration distance.

* * * * *